US012234900B2

(12) United States Patent
Plante et al.

(10) Patent No.: US 12,234,900 B2
(45) Date of Patent: Feb. 25, 2025

(54) LOW-IMPEDANCE ACTUATION DEVICE USING MAGNETORHEOLOGICAL FLUID CLUTCH APPARATUSES

(71) Applicant: EXONETIK INC., Sherbrooke (CA)

(72) Inventors: Jean-Sebastien Plante, Sherbrooke (CA); Jean-Philippe Lucking Bigue, Sherbrooke (CA); Catherine Veronneau, Waterville (CA); Pascal Larose, Sherbrooke (CA)

(73) Assignee: EXONETIK INC., Sherbrooke (CA)

( * ) Notice: Subject to any disclaimer, the term of this patent is extended or adjusted under 35 U.S.C. 154(b) by 102 days.

(21) Appl. No.: 17/795,736

(22) PCT Filed: Feb. 8, 2021

(86) PCT No.: PCT/CA2021/050137
§ 371 (c)(1),
(2) Date: Jul. 27, 2022

(87) PCT Pub. No.: WO2021/155478
PCT Pub. Date: Aug. 12, 2021

(65) Prior Publication Data
US 2023/0098877 A1 Mar. 30, 2023

Related U.S. Application Data

(60) Provisional application No. 62/970,736, filed on Feb. 6, 2020.

(51) Int. Cl.
*F16H 47/00* (2006.01)
*B25J 9/10* (2006.01)
(Continued)

(52) U.S. Cl.
CPC .............. *F16H 47/00* (2013.01); *B25J 9/102* (2013.01); *F16D 37/02* (2013.01); *B25J 19/0004* (2013.01)

(58) Field of Classification Search
CPC .......... F16H 47/00; F16H 47/10; F16D 37/02; F16D 37/008
See application file for complete search history.

(56) References Cited

U.S. PATENT DOCUMENTS 4,858,491 A * 8/1989 Shube .................. B64C 13/341
192/141
8,322,242 B2 * 12/2012 Gronli ..................... F16H 25/20
74/89.29
(Continued)

FOREIGN PATENT DOCUMENTS

WO 2017185176 A1 11/2017
WO 2018068145 A1 4/2018
(Continued)

*Primary Examiner* — Gregory Robert Weber
(74) *Attorney, Agent, or Firm* — NORTON ROSE FULBRIGHT CANADA LLP

(57) ABSTRACT

A magnetorheological (MR) actuator device comprising two or more MR actuator units. Each of the MR actuator units may include a motor, an MR fluid clutch apparatus operatively coupled to the motor to receive torque from the motor, the MR fluid clutch apparatus operable to generate a variable amount of torque transmission when subjected to a magnetic field. An output member is provided, a transmission operatively coupling the at least two MR actuator units to the output member, for the output member to receive torque from the MR actuator units. A controller for controlling the two or more MR actuator units to drive the output member, the controller driving the output member in at least an antagonistic mode in which the MR actuator units transmit torque in opposite directions to the output member. A collaborative mode may be provided to combined the torque of the two or more MR actuator units in a common direction on the output member.

14 Claims, 24 Drawing Sheets

(51) Int. Cl.
*F16D 37/02* (2006.01)
*B25J 19/00* (2006.01)

(56) References Cited

U.S. PATENT DOCUMENTS

| | | | |
|---|---|---|---|
| 11,022,206 B1 * | 6/2021 | Krebs | F16H 48/08 |
| 11,254,016 B2 * | 2/2022 | Lee | B25J 9/14 |
| 2018/0156285 A1 | 6/2018 | Plante et al. | |
| 2018/0370591 A1 | 12/2018 | Denninger et al. | |
| 2019/0128340 A1 * | 5/2019 | Denninger | F16D 7/02 |

FOREIGN PATENT DOCUMENTS

| | | | | |
|---|---|---|---|---|
| WO | WO-2018218336 A1 * | 12/2018 | | A61F 2/70 |
| WO | 2019018079 A1 | 1/2019 | | |
| WO | 2019204917 A1 | 10/2019 | | |

* cited by examiner

LOW-IMPEDANCE ACTUATION DEVICE USING MAGNETORHEOLOGICAL FLUID CLUTCH APPARATUSES

TECHNICAL FIELD

The present application relates generally to the field of actuators, robotic joints, haptic devices or powertrains, and more particularly, to actuators, robotic joints, haptic devices or powertrains using magnetorheological (MR) fluid clutch apparatuses.

BACKGROUND OF THE ART

Actuators are devices that are used to generate a controllable force or torque on a system. A typical application of an actuator is found in a haptic system or robot. Haptic systems are devices that may involves physical contact between an actuated device and a human user.

Robots are devices that are able to manipulate objects or perform tasks using a series of rigid links or members interconnected via articulations or actuated robotics joints. Typically, each joint represents a degree of freedom (DOF) and is controlled by one or more actuators. End effectors are particular links used for performing certain tasks, e.g. grasping a work tool or an object.

Collaborative robots are robots that can be set up to work in environments close to humans and even setup to work together or assist humans in their work. Typical collaborative robots are robotic arms that have a plurality of interconnected robot joints enabling movements. The robot joints have an output flange or shaft that can be connected to another robot joint and a joint motor configured to rotate the output flange or shaft. The robot joints can be connected directly together or connecting element can be provided between two robot joints.

Many robots have been introduced over the years. Typically, robots use electric motors to actuate the joints, although several other actuation technologies such as hydraulic or pneumatic actuation may also be used. Such actuator types may have a relatively low force/position/speed bandwidth and high impedance which may cause discomfort to the user if the robot is directly in contact with them. This discomfort often disrupts device function, limits interaction with humans or the environment and decreases the interest in humans to collaborate with such devices.

Collaborative robots generally employ an electric motor/generator unit to provide power to the joint. Internal combustion engines, turbines, hydraulic pump, air pressure turbines or any other power source may be used to generate the energy required by the actuator. Robots may also be composed of more than one assistive power source. For the sake of simplicity, any power source will be hereinafter referred to as an assistive power source. Some robots use mechanical (e.g.: gears, linkages), hydraulic or pneumatic transmissions to route the power to the joints.

Electrical motors are most often used because they have higher bandwidth than other types of actuators. In electrical motor, where high dynamic response is sought, the most common form of electromechanical actuation is found in direct-drive motors, which may be prohibitively heavy for robotic joints. Device weight can be considerably reduced by providing a reduction ratio between the motor and mechanical linkages. Indeed, when coupled to a speed reducer (e.g., gearbox), electromechanical actuators are lighter and less expensive than direct drive solutions for a given torque output, but their higher output inertia, friction and backlash may diminish their dynamic performance. They may not be have the same bandwidth. A good example would be a robot where a single electric motor and a speed reducer, such as a harmonic drive gearbox, are combined to provide a high torque-density actuator. The bandwidth of such actuator is comparatively lower than that of the electric motor or that of an electric motor of equivalent torque. The torque required to back-drive the robot may also be higher due to the friction of the gear system and the reflected inertia of the motor and gearbox.

If a user is in contact with the robot and moves faster than the maximum speed of the actuator, the user will oppose its force against the robot. This situation may cause human injuries or discomfort due to low back-drivability. Also, such robots may not easily be controlled due to their low bandwidth and high inertia, causing the user to feel engagement and disengagement of the assistive power source. Low bandwidth of the powertrain may be caused by the high inertia of parts that oppose to speed change in the system as well as the friction and backlash of the system. When the user input speed varies, the high inertia of the system may be perceived or felt by the user and can become a nuisance or danger. A system with a low bandwidth (i.e., having a response frequency lower than that of the human being for example) may not adapt rapidly enough to human muscular dynamics such that the user may feel connected to a mechanical device that may cause an adaptation delay. The nuisance may come from the fact that the mechanical system speed is not able to follow the user's input speed, creating sticking or unnatural movement. Higher bandwidth, i.e., greater reactivity, would make the robot more transparent to the user. For example, if someone wants a device to apply a proportional assistance to the user's applied force in order to create the illusion of ease in moving loads, but the system has low bandwidth, the assistance will not adapt rapidly enough and will create a delay in the applied force that may be felt by the user. A system with a low bandwidth and high inertia may not adapt rapidly enough in case of an unwanted collision with the user, which may cause harm to the user. Usually, the bandwidth of an actuator may be reduced by inertial effects. For this reason, as the inertia increases, the actuator may lose its ability to adapt to the human change and become dangerous for human interaction.

For controllability reasons, new technologies are needed to match the impedance of assistive devices with the impedance of the human or the environment. In such devices, where assistive actuators work in concert with the human or environment and where smooth movement is sought, the technology used should have a bandwidth that may even be higher than the bandwidth of human or device that is assisted. The higher the bandwidth and the lower the inertia of the system contacting the human, the more transparent to the human the system will be and the more natural it will feel. When there is an unpredictable source in contact with the robot, the bandwidth of the assistive powertrain needs to match or exceed the bandwidth the source, otherwise the controllability of the system may not be optimal. Also, the actuators at the joint of the robot assisting the human may need to be physically or programmed to be compliant and easily backdrivable in order not to be damaged or to work as intended. A system in contact with the human body or environment needs to be compliant or backdrivable so as not to expose the human to unwanted forces or accelerations that could hurt the human or damage the actuator.

Other types of devices or equipment are recognised as providing human assistance similarly to robots, since they combine human power with the power of an additional source to assist the human. A good example of this is a prosthesis or exoskeletons. In prostheses, a human is connected to the device that replaces a missing human limb. To reach smoother movement control, new technologies are needed, new technologies that would allow the admittance of the system to match or exceed the admittance of the human body. With such new technology, a device could also be paired with sensors that would help to identify the desired human force or movement and adjust the action of the prosthesis or exoskeleton to move in harmony with the human body.

Similarly, haptic devices or equipment are recognised as providing human assistance by the way of forces applied to the human body. A good example of this is a medical simulation arm providing sensation from a virtual world or plane active sidestick providing information about the safe flight envelope of the aircraft to the pilot. In such applications, a human is connected to the device.

SUMMARY

It is an aim of the present disclosure to provide a collaborative robotic device such as a collaborative robot, haptic device, prosthesis, orthosis or exoskeleton that employs MR fluid actuation.

It is also an aim of the present disclosure to present an actuator or collaborative device having multiple MR fluid actuators.

It is further an aim of the present disclosure to present an actuated device having an antagonist MR fluid actuator to reduce the induced torque generated by the robotic joint to a human by actively compensating for parasitic effects (backlash, friction, viscosity).

It is an additional aim of the present disclosure to present an actuated device having multiple MR fluid actuators selectively actuated by different MR fluid clutch apparatuses to create a multi degree-of-freedom actuated device.

It is another aim of the present disclosure to present a collaborative device that has an MR fluid actuator device contributing to decrease the reflected inertia of the device and transform an output of a low bandwidth power source into a high bandwidth response.

In a first aspect of the present disclosure, there is provided a magnetorheological (MR) actuator device comprising: at least two MR actuator units, each of the MR actuator units including at least a motor, and an MR fluid clutch apparatus operatively coupled to the motor to receive torque from the motor, the MR fluid clutch apparatus operable to generate a variable amount of torque transmission when subjected to a magnetic field; an output member; a transmission operatively coupling the at least two MR actuator units to the output member, for the output member to receive torque from the at least two MR actuator units; a controller for controlling the at least two MR actuator units to drive the output member, the controller driving the output member in at least an antagonistic mode in which the at least two MR actuator units transmit torque in opposite directions to the output member.

Further in accordance with the first aspect, for example, the motor is bi-directional in each of the MR actuator units, and wherein the controller driving the output member a collaborative mode in which the at least two MR actuator units transmit torque in a common direction to the output member.

Still further in accordance with the first aspect, for example, at least one reduction mechanism is between the bi-directional motor and the MR fluid clutch apparatus output member for at least one of the at least two MR actuator units.

Still further in accordance with the first aspect, for example, the transmission has at least one reduction mechanism between the MR fluid clutch apparatus and the output member for at least one of the at least two MR actuator units.

Still further in accordance with the first aspect, for example, the transmission includes a spiral bevel gear coupled to the output member for at least one of the at least two MR actuator units.

Still further in accordance with the first aspect, for example, a rotational axis of the spiral bevel gear is parallel to a rotational axis of the MR fluid clutch apparatus.

Still further in accordance with the first aspect, for example, the spiral bevel gear is a hypoid gear or a spheroid gear.

Still further in accordance with the first aspect, for example, the output member is a crown gear.

Still further in accordance with the first aspect, for example, there are at least three of the two MR actuator units.

Still further in accordance with the first aspect, for example, the controller in the antagonistic mode drives the output member by having two of the MR actuator units transmit torque in a common direction to the output member, and having a third of the MR actuator units transmit torque to the output member in a direction opposite to the direction of the two MR actuator units.

In accordance with a second aspect of the present disclosure, there is provided a system for driving an output member of a magnetorheological (MR) actuator device having at least two MR actuator units, the system comprising: a processing unit; a non-transitory computer-readable memory communicatively coupled to the processing unit and comprising computer-readable program instructions executable by the processing unit for: controlling the at least two MR actuator units to transmit torque in a common direction to a common output member in a collaborative mode; controlling the at least two MR actuator units to transmit torque in opposite directions to the common output member in an antagonistic mode.

Further in accordance with the second aspect, for example, controlling the at least two MR actuator units in the collaborative mode includes controlling a slippage in at least one MR fluid clutch apparatus.

Still further in accordance with the second aspect, for example, controlling the at least two MR actuator units in the antagonistic mode includes controlling a slippage in at least one MR fluid clutch apparatus.

Still further in accordance with the second aspect, for example, three of the MR fluid actuator units are provided and controlling the MR actuator units in the antagonistic mode includes controlling two of the MR actuator units to transmit torque in a common direction to the output member, and controlling a third of the MR actuator units to transmit torque to the output member in a direction opposite to the direction of the two MR actuator units.

Still further in accordance with the second aspect, for example, the at least two of the MR actuator units are as described above.

In accordance with a third aspect of the present disclosure, there is provided a single degree of freedom actuation system comprising: at least two MR fluid clutch apparatuses and at least two power sources, a first interface adapted to be secured to a part, a second interface adapted to be secured to a second movable part, at least one joint providing at least one degree of freedom between the first interface and the second interface; the at least two MR fluid clutch apparatus operable to generate a variable amount of torque transmission when subjected to a magnetic field; a transmission coupling the MR fluid clutch apparatuses to the actuation system; wherein the at least two MR fluid clutch apparatuses may be independently controlled to act antagonistically or in the same direction.

Further in accordance with the third aspect, for example, each MR fluid clutch apparatus is connected to its own independent power source.

Still further in accordance with the third aspect, for example, the force generated by the MR fluid actuators may be added one to the other.

Still further in accordance with the third aspect, for example, the force generated by the MR fluid actuators may be applied antagonistically in opposite directions.

Still further in accordance with the third aspect, for example, at least one of the MR fluid actuators is equipped with a brake.

Still further in accordance with the third aspect, for example, the mechanism is equipped with an independent brake.

Still further in accordance with the third aspect, for example, a power source is connected to multiple MR clutch apparatuses.

Still further in accordance with the third aspect, for example, the actuation system is having a biasing member that applies the force in a single direction.

Still further in accordance with the third aspect, for example, the actuation system is a rotation joint.

Still further in accordance with the third aspect, for example, the actuation system is a translation joint.

Still further in accordance with the third aspect, for example, the actuation system is combining rotation and translation movement.

In accordance with a fourth aspect of the present disclosure, there is provided a multiple degree of freedom actuator comprising: at least three MR fluid clutch apparatus and at least three power sources, a first interface adapted to be secured to a part, a second interface adapted to be secured to a second movable part, at least one joint providing at least two degree of freedom between the first interface and the second interface; the at least three MR fluid clutch apparatus operable to generate a variable amount of torque transmission when subjected to a magnetic field; a transmission coupling the MR fluid actuator unit to the actuation system; wherein the at least three MR fluid clutch apparatuses may be independently controlled to cooperate to generate a vector of force in a desired direction.

Further in accordance with the fourth aspect, for example, each MR fluid clutch apparatus is connected to its own independent power source.

Still further in accordance with the fourth aspect, for example, the force generated by the MR fluid clutch apparatuses may be added one to the other.

In accordance with a fifth aspect of the present disclosure, there is provided a system for driving an output member of a magnetorheological (MR) actuator device having at least two MR actuator units respectively outputting maximum torque T1 and torque T2, the system comprising: a processing unit; a non-transitory computer-readable memory communicatively coupled to the processing unit and comprising computer-readable program instructions executable by the processing unit for: controlling the at least two MR actuator units to transmit torque in a common direction to a common output member in a collaborative mode, the torque at the common output member in the collaborative mode being greater than maximum torque T1 or maximum torque T2; controlling the at least two MR actuator units to transmit torque in opposite directions to the common output member in an antagonistic mode, the torque at the common output member in the antagonistic mode being at most equal to maximum torque T1 or maximum torque T2.

Further in accordance with the fifth aspect, for example, controlling the at least two MR actuator units in the collaborative mode includes controlling a slippage in at least one MR fluid clutch apparatus.

Still further in accordance with the fifth aspect, for example, controlling the at least two MR actuator units in the antagonistic mode includes controlling a slippage in at least one MR fluid clutch apparatus.

Still further in accordance with the fifth aspect, for example, controlling the at least two MR actuator units to transmit torque in the collaborative mode, includes controlling the at least two MR actuator units to transmit torque at the common output member being a sum of maximum torque T1 or maximum torque T2.

Still further in accordance with the fifth aspect, for example, there are three of the MR fluid actuator units with a third MR fluid actuator unit outputting maximum torque T3, and controlling the MR actuator units in the antagonistic mode includes controlling two of the MR actuator units to transmit torque in a common direction to the output member, and controlling a third of the MR actuator units to transmit torque to the output member in a direction opposite to the direction of the two MR actuator units, the torque at the common output member in the antagonistic mode being at most equal to maximum torque T1, maximum torque T2 or maximum torque T3.

Still further in accordance with the fifth aspect, for example, the at least two of the MR actuator units are in accordance with any one of claims 2 to 10

In one embodiment, the collaborative device includes two independent and reversible assistive power sources (i.e. motors); two selectively engageable magnetorheological fluid (MRF) clutches connected between two power sources and a transmission device. A power source may be operatively connected to the magnetorheological fluid clutch for selectively providing power to the collaborative device via the magnetorheological fluid clutch, and in some configurations, to receive energy from the magnetorheological fluid clutch apparatus in braking or regenerative braking of the movement.

The collaborative robotic device may also include a controller/drive unit and energy storage device operatively connected to the assistive power source. The assistive power source may be operatively connected directly to the human power source and to the magnetorheological fluid clutch apparatus. Alternatively, the assistive power source is directly connected to the magnetorheological fluid clutch apparatus and operatively connected to the human by engagement of the magnetorheological fluid clutch apparatus.

The assistive power source may be connected to the input side or the output side of the magnetorheological fluid clutch apparatus.

These and other objects, features and advantages, according to the present invention, are provided by a collaborative system including a frame, an additional source of power and MR fluid actuation means or a MR fluid actuator optionally operatively connected in parallel to the human power input of the powertrain for applying controllable additional power to the system thereof. MR fluid actuator may also be connected in series with the human power input in the case of a prosthesis. The MR fluid actuator preferably includes a MR fluid having a controllable apparent viscosity, a housing connected to the apparatus frame or skeleton and containing the MR fluid, and a rotary shaft extending outwardly from the housing and operatively connected between the MR fluid and the powertrain.

Control means, such as a microprocessor operating under a program control, may be operatively connected to the MR fluid force modulation means for causing a predetermined magnetic field strength to be applied to the MR fluid based upon a selected force modulation program that can consider information from sensors. Accordingly, a desired amount of force or power from the assistive power source can be provided to the powertrain in order to increase or decrease output of the powertrain during the collaborative robot usage. The system may further comprise a sensor to measure the input of the human force or power to the system in order to control the output required by the assistive power source.

The collaborative system may further comprise a display operatively connected to the control means. The control means may also include means for permitting the input of a program or of operating parameters. In addition, one or more sensors may be associated with the MR fluid force modulation means and connected to the control means for generating and displaying on the display the additional force or power provided by the source of power.

MR fluid actuators may be used on all kinds of collaborative systems such as but not limited to robots and haptic devices. Also, the powertrain can be used on various types of wearable system like exoskeletons, orthoses, body extensions, human controlled robot, only to name a few.

In complex collaborative controlled robots, the powertrain may be used to move objects combining the human power with an assistive power source or power sources. Benefit and principles are the same as with collaborative robotic system. The objectives may still be to increase acceleration, improve control over the equipment or provide more force or power to the human operated equipment. An example of this is a working exoskeleton that may be used to support tools. The addition to a working exoskeleton of a MR fluid actuator connected to one of more body member would bring benefits. One or more sensors may be installed on the components and power sent to the members in proportion to the effort generated by the user, so that the user stays in control of the piece of equipment.

In other wearable devices, a robotic arm may be installed directly on a human. Manual labour is widely used in industrial sectors dealing with large assemblies such as aircrafts, ships, trains, heavy steel industry and the construction industry. The day-to-day tasks of assembly workers often require lifting heavy workpieces and work in non-ergonomic positions, such as raising arms for extended periods of time. Such conditions result in employee fatigue, increased risk of injury, and reduced production efficiency. A promising approach is to leverage the mobility and flexibility of human workers by augmenting their abilities with robotics technologies instead of trying to fully replace them. With wearable robots, the problem of accessing manufacturing sites is solved by using the mobility of human workers. Moreover, workers can direct in situ the work of the robots with no need for complex programming hence leading to increased versatility over traditional robotics. A wearable collaborative robotic tool (WCRT) to assist assembly workers may be used. With the high bandwidth of MR fluid actuation, this tool may filter human induced perturbations. As an example, assistance in gravity compensation, exerting a force on a surface or stabilising the position of an end effector in space may be achieved. These are only a few of the functions that the WCRT may assist in performing.

While supernumerary robotics arms are a promising new type of wearable robots, they also have challenges of their own. Since the robot is attached to the human, the robot must be able to accomplish its tasks despite disturbances due to the movement of the human. Accordingly, actuators capable of very fast motions are required while maintaining control of the output force, for instance to hold a panel in place. The robot must be lightweight in order not to impede the human worker. More specifically, the mass of the system must also be very close to the human body to avoid exhausting the human and be counter-productive.

Traditional electric motor actuation, results in a trade-off between speed and torque density. A robotic arm using direct-drive electric motors may have the capability of controlling its output force despite fast motion of the human base but may be heavy due to a poor force density. On the other hand, a robot using highly-geared motors may be too slow to compensate for motions of the human. While geared-motors used in conjunction with force sensors or elastic elements can be used to control of the output force in quasi-static situations, they remain a compromised solution with speed limitations and may not optimally maintain force control when the relative motion is too fast. Magnetorheological fluid actuators may offer good force fidelity for lightweight robotics or wearable actuation systems.

While magnetorheological fluid actuators may present advantages when used in known configurations, it may present additional advantages to provide a new modular system that may be composed of multiple independent MR fluid actuators that may be used in various operating modes. For example, a robotic joint that is composed for two (2) MR fluid actuators MRA1 and MRA2 with independent and reversible inputs are both connected to the same output and may be used in multiple modes (e.g.: Antagonistic and Collaborative). In Collaborative mode, both MRA1 and MRA2 are turning in the same direction (i.e. clockwise direction) and the maximum torque of both MRA1 and MRA2 may be added to reach highly controllable maximum torque in a single direction (i.e clockwise). In a power mode, both MRA1 and MRA2 may be reversed (i.e. counter-clockwise direction) so that the maximum torque of both MRA1 and MRA2 may be added to reach highly controllable maximum torque in a single second direction (i.e., counter-clockwise). In Antagonistic mode, MRA1 and MR2 may be turning in opposite directions (i.e. MRA1 is turning clockwise and MRA2 is turning counter-clockwise), MRA1 and MRA2 may each provide a highly controllable torque in two opposite directions. In Antagonistic, it may be understood that the maximum attainable torque of the modular system may be less of the torque that is attainable in Collaborative. However, it may be understood that that torque reversal bandwidth in Antagonistic mode will be superior than in Collaborative mode because the motors of the MR actuators do not have to change rotational direction in order to provide a torque in two opposite directions at the output. One advantage of this modular system may be that the overall weight and inertia of the system may be reduced compared to conventional actuation systems and to known configurations or MRF actuators which have a same maximal torque output than the modular system in Collaborative mode, due to the torque summation of MRA1 and MRA2. This advantage may increase the overall dynamic performance of the device. Moreover, this advantage greatly reduces the effect of an undesirable impact with a human or object, due to the reduced weight and actuation inertia of the system as compared to other robotic systems. Another advantage of the modular system composed of multiple independent MR fluid actuators may be that the mechanical backlash may be canceled if MRA1 and MR2 are turning in opposite directions (e.g.: in Antagonistic mode). In Antagonistic mode, if an impact is detected, the effect may be even further decreased as the force in the opposite direction than the contact may be applied with high bandwidth and with no backlash, reducing the impact energy on the impacted body. This may be very useful when there are chances to get in contact with a human body that could be hurt.

In yet another mode, the locked mode, the MR clutches of both MRA1 and MRA2 may be independently locked (e.g.: by the application of a magnetic field). In a locked mode, the MR clutches may act as transfer devices with inherent torque limiting attributes, thus limiting the total output torque of the system to a desired value. In a locked mode, both motors may be controller independently or jointly in order to produce a total torque output to the system. For instance, the direction (i.e. clockwise direction) and the maximum torque of both MRA1 and MRA2 may be added to reach the maximum torque in a single direction (i.e. clockwise). It may be understood that that in the locked mode, the total inertia reflected at the output of the system is increased due to the added inertia of the motors and gearboxes of each MRA. However, the locked mode may have the advantage of eliminating the slippage between the MR clutch input and output, which may increase the durability of the MR device.

Actuated devices such as robots do not need high power or high bandwidth all the time. Collaborative mode may de desirable to accelerate and decelerate a robotic device and when an operation requires high torque. Antagonistic mode may sometime be desired to eliminate backlash and provide high bandwidth. Locked mode may sometimes be desired to maximise the durability of the system. The robotic joint composed of multiple MR fluid actuator with independent inputs may thus present benefits for selective control modes.

Furthermore, a system composed of more than two MR actuators may allow each actuator to provide torque in a selected direction. This may allow a system with three (3) MR actuators to be ready to deliver higher torque in a direction (i.e. clockwise) where the torque of two (2) MR actuators are turning in the same direction (i.e. clockwise) while maintaining Antagonistic mode capability in the direction when the other MR actuator is turning (i.e. counter clockwise). In such a system with three (3) MR actuators, two MR actuators could be powered by a single motor while the other MR actuator could be powered by a different motor.

A modular system that may be composed of multiple independent MR fluid actuators for a single degree of freedom may also allow for redundancy as a device may maintain part of its functionality if one component of a MR actuator (e.g., the motor) fails. The other MR actuator or MR actuators may still be used to perform the task. Thus a modular embodiment with independent MR fluid actuators may have the capability of mitigating certain failure modes. MR fluid clutch apparatuses are generally designed to transfer torque between the input rotor and the output rotor in response to a given control current supplied to its coil. In case of any clutch failure resulting in an undesired torque transmission, the effect on the system may be a runaway of the output member. For certain applications (e.g. aircraft active inceptor or flight surfaces actuation, vehicle steer by wire actuation), there might be situations where this type of malfunction is deemed unacceptable. A possible solution may be to limit the input rotor speed in order to decrease the severity of the failure. The adverse effect of this mitigation is the limitation of the overall performance of the actuator. Moreover, it is possible to mitigate other types of failures such as motor failure and gearbox failure only to name a few since the configuration is inherently redundant. The proposed embodiment presents the advantage of controlling independently each drive motor, hence each input rotor. This way, the control system can vary dynamically the rotational speed of each drive motor in order to respect given safety criteria. For instance, in a given situation, a runaway may be catastrophic in one direction whereas the severity of the same malfunction in the opposite direction may be lower. In this situation, the control system could adapt the speed of each input rotor in order to maintain full performance in the direction in which a malfunction is less critical, while ensuring safety by limiting the performance in the direction in which the failure would have a catastrophic effect.

In an embodiment with multiple MR actuators, the system may be more controllable.

Therefore, in accordance with the present disclosure, there is provided a lightweight low-impedance actuation device using multiple magnetorheological fluid clutch apparatuses.

DESCRIPTION OF THE DRAWINGS

FIG. 16' is a schematic representation of the MR actuation device of FIG. 8 in low force/high bandwidth mode;

DETAILED DESCRIPTION

Figure 1:
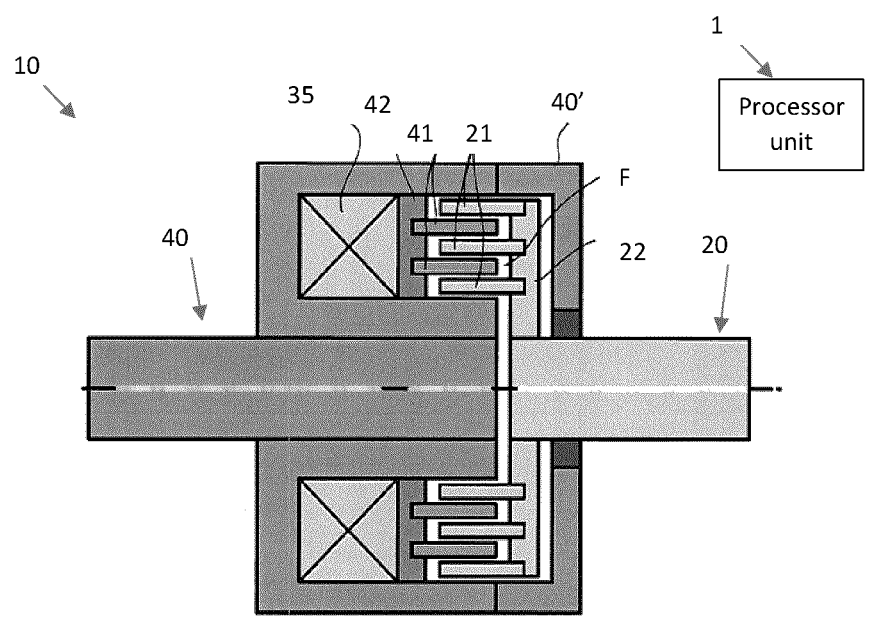
FIG. 1 is a schematic view of a generic magnetorheological (MR) fluid clutch apparatus, used by various embodiments of the present disclosure.

Referring to FIG. 1, there is illustrated a generic magnetorheological (MR) fluid clutch apparatus 10 configured to provide a mechanical output force based on a received input current provided by a processor unit 1 controlling the MR fluid clutch apparatus 10. The processor unit 1 is any type of electronic or electric device having controlling capability to control input current sent to the MR fluid clutch apparatus 10. In an embodiment, the processor unit 1 may receive signals from sensors, and compute data, for instance by way of firmware, to control the operation of the MR fluid clutch apparatus 10 based on settings, on requested assistance, etc, as will be explained hereinafter. The MR fluid clutch apparatus 10 has a driving member 20 with a disk 22 from which project drums 21 in an axial direction, this assembly also known as input rotor 20. The MR fluid clutch apparatus 10 also has a driven member 40 with a disk 42 from which project drums 41 intertwined with the drums 21 to define an annular chamber(s) filled with an MR fluid F. The assembly of the driven member 40 and drums 41 is also known as the output rotor 40. The annular chamber is delimited by a casing 40' that is integral to the driven member 40, and thus some surfaces of the casing 40 opposite the drums 21 are known as shear surfaces as they will collaborate with the drums 21 during torque transmission, as described below. The driving member 20 may be an input shaft in mechanical communication with a power input, and driven member 40 may be in mechanical communication with a power output (i.e., force output, torque output). MR fluid F is a type of smart fluid that is composed of magnetisable particles disposed in a carrier fluid, usually a type of oil. When subjected to a magnetic field, the fluid may increase its apparent viscosity, potentially to the point of becoming a viscoplastic solid. The apparent viscosity is defined by the ratio between the operating shear stress and the operating shear rate of the MR fluid F comprised between opposite shear surfaces—i.e., that of the drums 21 on the driving side, and that of the drums 41 and of the shear surfaces of the casing 40' in the annular chamber. The magnetic field intensity mainly affects the yield shear stress of the MR fluid. The yield shear stress of the fluid when in its active ("on") state may be controlled by varying the magnetic field intensity produced by electromagnet 35 integrated in the casing 40', i.e., the input current, via the use of a controller such as the processor unit 1. Accordingly, the MR fluid's ability to transmit force can be controlled with the electromagnet 35, thereby acting as a clutch between the members 20 and 40. The electromagnet 35 is configured to vary the strength of the magnetic field such that the friction between the members 20 and 40 may be low enough to allow the driving member 20 to freely rotate with the driven member 40 and vice versa, i.e., in controlled slippage.

The driving member 20 is driven at a desired speed by a power source, like a rotary geared electric motor, and the output rotor is connected to a mechanical device to be controlled. The torque transmitted by the MR fluid clutch apparatus 10 is related to the intensity of the magnetic field passing through the MR fluid. The magnetic field intensity is modulated by a coil of the electromagnet 35, as controlled by the processor unit 1.

Figure 2:
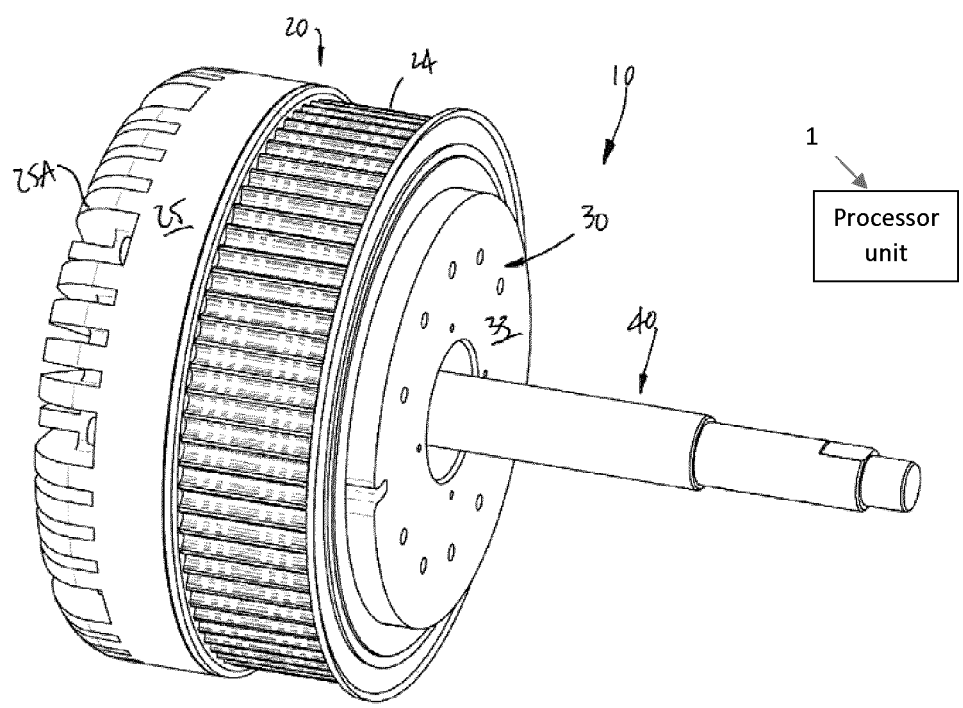
FIG. 2 is a perspective view of an MR fluid clutch apparatus of the present disclosure, as assembled.
Figure 3:
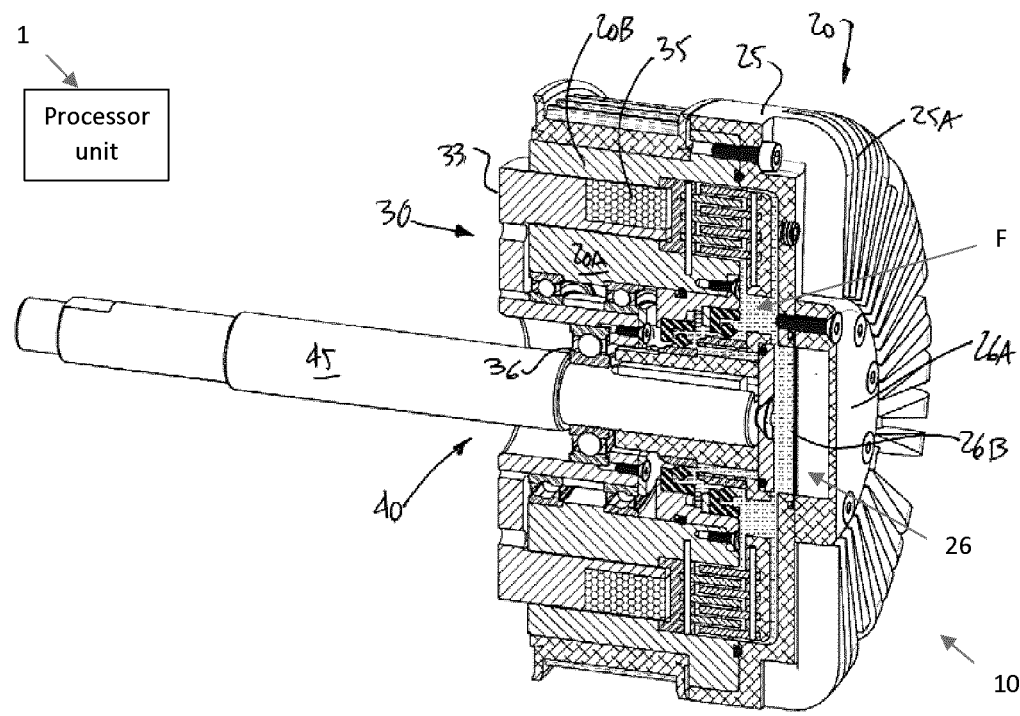
FIG. 3 is a partly sectioned view of the MR fluid clutch apparatus of FIG. 2.
Figure 4:
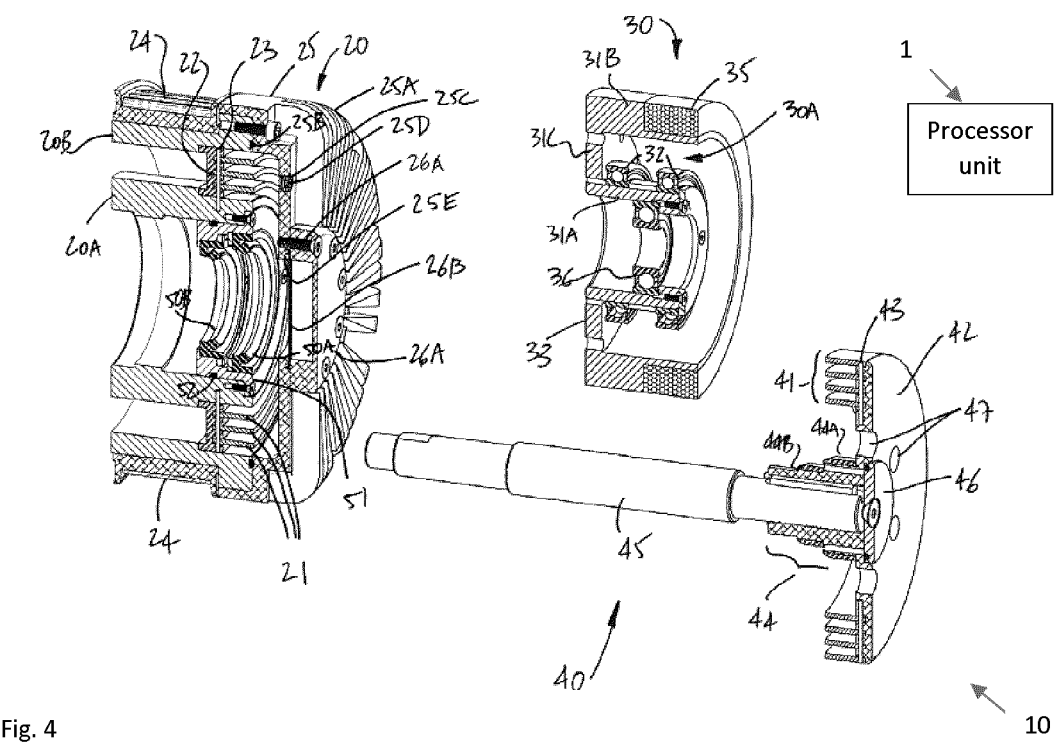
FIG. 4 is an exploded view of the MR fluid clutch apparatus of FIG. 2.

Referring to FIGS. 2, 3 and 4, the MR fluid clutch apparatus is generally shown at 10 as a whole. The MR fluid clutch apparatus 10 has similar components as the generic exemplary MR fluid clutch apparatus 10 of FIG. 1, whereby like reference numerals will refer to like components. The MR fluid clutch apparatus 10 has the input rotor 20, also known as the driving member, a stator 30 (including a coil), and the output rotor 40 also known as the driven member, and a MR fluid is located in an MR fluid chamber that is defined in the free space including the space between the drums of the rotor 20 and the rotor 40.

The input rotor 20 may be driven at a constant or variable speed prescribed by a rotary power source, not shown, like a rotary internal combustion engine or electric motor. The output rotor 40 is connected to a mechanical output, not shown, to be controlled. When a current circulates in the coil 35 of the stator 30, a magnetic field is induced in the stator 30 and passes through the drums and the MR fluid F. Then, a torque, dependent on the magnetic field intensity, is transmitted from the input rotor 20 to the output rotor 40 by shearing the MR fluid F in between the drums. Although the description that follows indicates that the rotor 20 is the input rotor and the rotor 40 is the output rotor, it is pointed out that the rotor 20 could be the output rotor and the rotor 40 could be the input rotor. However, for the sake of clarity and simplicity and to avoid unnecessary redundancy, the description will pursue with "input rotor 20" and "output rotor 40".

As best seen in FIGS. 3 and 4, the input rotor 20 has an inner magnetic core 20A and an outer magnetic core 20B, spaced apart from one another. The inner magnetic core 20A and outer magnetic core 20B are made of a ferromagnetic material that may have a high permeability, a high magnetization saturation, a high electrical resistivity and low hysteresis, such as silicon iron. Materials having a high electrical resistivity allow the magnetic field to establish faster by minimizing Eddy current and thus enhanced dynamic performance is achieved.

Cylindrical input drums 21 are secured to a drum holder 22 (also known as disc, plate, ring, etc), with the drum holder 22 spanning the radial space between the inner magnetic core 20A and the outer magnetic core 20B. In an embodiment, the drums 21 are in a tight-fit assembly in channels of the drum holder 22 and dowel pins 23 pass through all drums 21. The dowel pins 23 may also penetrate the inner magnetic core 20A, as shown in FIGS. 3 and 4. The drum holder 22 may consist of a non-ferromagnetic material to minimize the magnetic field passing through it and may also have a high electrical resistivity to minimize resistive loss during transient operation of the MR clutch apparatus 10.

In an example among many others, the input rotor 20 may be driven by a power source through a driving gear, or any other driving member, like a chain sprocket, a belt, a friction device. For illustrative purposes, a gear portion 24 is provided for interconnection with a gear (not shown), the gear portion 24 being a toothed gear for cooperation with a driving gear. The gear portion 24 may be tight-fitted or glued or positively locked to the outer magnetic core 20B, using mechanical fasteners, or the like.

A cover 25 is fixed to the outer magnetic core 20B, and in an embodiment made of aluminum for cooling purposes. Thermal fins 25A may be present on the cover 25 so that the MR fluid clutch apparatus 10 is cooled down by forced convection when the input rotor 20 rotates. The thermal fins 25A help to decrease the operating temperature of the MR fluid and may thus improve the life of the MR fluid clutch apparatus 10. The cover 25 may press a face static seal 25B onto the outer magnetic core 20B to prevent MR fluid leakage. Fill ports 25C may be defined through the cover 25, to fill the MR fluid clutch apparatus 10 with MR fluid. As illustrated, the fill ports 25C may be tapped and plugged using sealed set screws 25D among other solutions.

A central hole 25E in the cover 25 is closed by an expansion chamber cap 26A equipped with a flexible membrane 26B to allow MR fluid expansion during either temperature increase or MR fluid phase transition when aged. To counter the bulging of the membrane 26B due to the MR fluid, some compliant material, such as polyurethane foam, may be placed in the empty expansion volume between the expansion chamber cap 26A and the flexible membrane 26B. The compliant material therefore exerts a biasing pressure on the membrane 26B. Also, a vent hole may be present in the expansion chamber cap 26A to avoid excessive pressure build up in the empty expansion volume. Expansion chamber 26 may also be formed with a compressible material (e.g., closed cell neoprene) that may take less volume as the pressure increases in the MR Fluid F. If a compressible material is present, the expansion chamber may not need a vent hole and may not need a membrane 26B.

Still referring to FIGS. 3 and 4, the stator 30 is made of a ferromagnetic material to guide the magnetic field. The stator 30 may have an annular body with an annular cavity 30A formed in its U-shaped section. The inner magnetic core 20A is received in the annular cavity 30A, which may be defined by an inner annular wall 31A, an outer annular wall 31B, and a radial wall 31C, all of which may be a single monolithic piece. The inner magnetic core 20A is rotatably supported by one or more bearings 32, a pair being shown in FIGS. 3 and 4. Although the bearings 32 are shown located between the inner magnetic core 20A and the stator 30, inward of the inner magnetic core 20A, it is considered to position the bearings 32 elsewhere, such as in radial fluid gaps described below. The stator 30 is for instance connected to a structure via bores on its outer face 33 (that is part of the radial wall 31C), and is thus the immovable component of the MR fluid clutch apparatus 10 relative to the structure.

Figure 5:
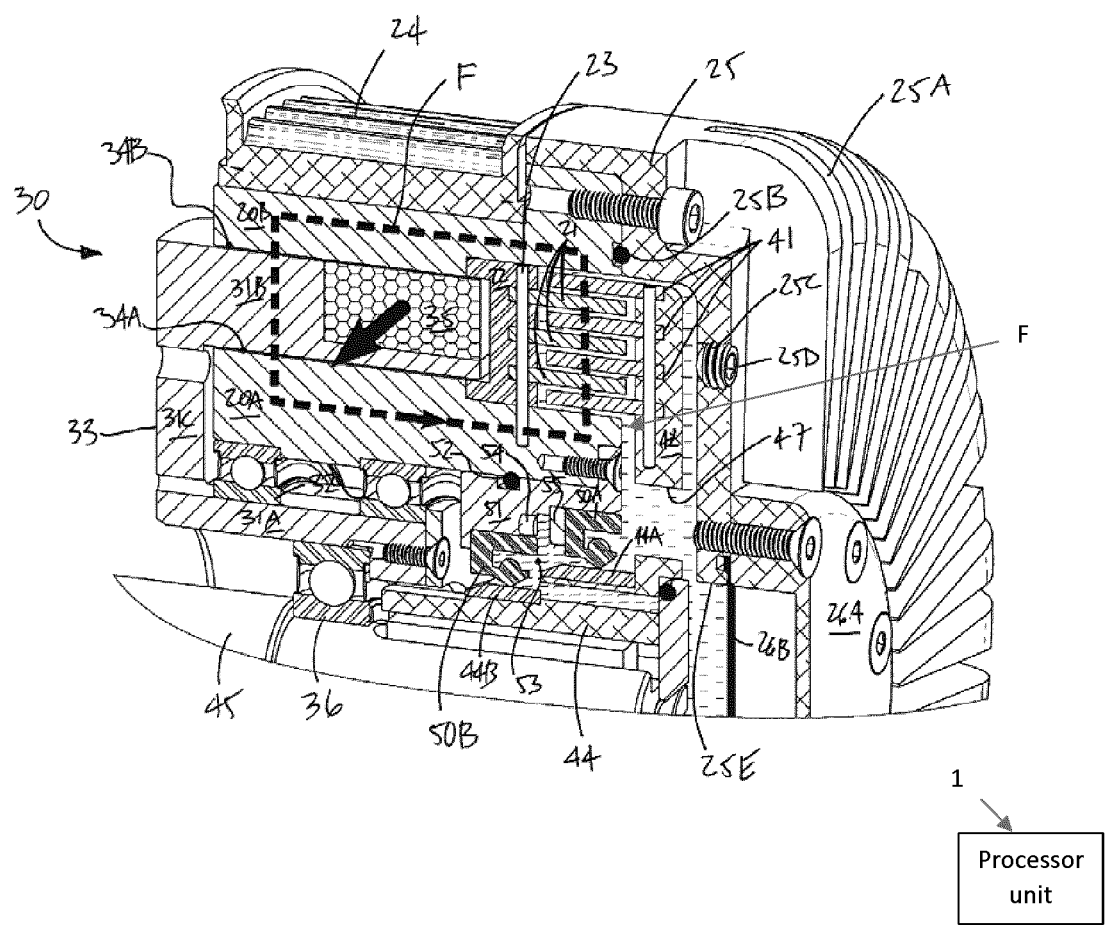
FIG. 5 is an enlarged view of the MR fluid clutch apparatus of FIG. 2, showing a magnetic field induced by a coil.

As best seen in FIG. 5, the stator 30 is sized such that radial fluid gaps 34A and 34B may be defined between the stator 30, and the inner magnetic core 20A and outer magnetic core 20B, respectively. The radial fluid gaps 34A and 34B, during use, are filled with a fluid, such as air and other gases, or lubricating and/or cooling liquids like oil, grease, etc. Hence, the radial fluid gaps 34A and 34B are free of solids during use. Coil 35 is secured to the annular body of the stator 30, for instance using an adhesive. It is contemplated to provide a slot through the stator 30 for passing wires connected to the coil 35, for powering the MR fluid clutch apparatus 10. The stator 30 further comprises one or more bearings 36 for rotatably supporting the output rotor 40, as described hereinafter.

The coil 35 may be wound using a high copper factor winding method. A higher copper ratio may lead to improved efficiency. Also considered are winding methods allowing flat wire winding, horizontal stacking, cylindrical stacking, for example. Multilayer PCBA winding is also considered (Heavy Copper PCBA) instead of copper only.

The bearings 32/36 are greased and may use no-contact seals to limit friction loss. The bearing arrangement featuring bearing(s) between the input rotor 20 and the stator 30, and separate bearing(s) between the stator 30 and the output rotor 40 enhances the safety of the MR fluid clutch apparatus 10. For example, if the input rotor 20 is jammed with the stator 30, the output rotor 40 is still free to rotate. Inversely, if the output rotor 40 is jammed with the stator 30, the power source that drives the input rotor 20 can still rotate.

The output rotor 40 has cylindrical output drums 41 that are secured to a drum holder 42 (e.g., plate, disc, etc) by a tight-fit assembly on the inner diameter of the drums 41. Dowel pins 43 may pass through the drums 41, among other ways to connect the output drums 41 to the drum holder 42. The output drums 41 are ferromagnetic so that the magnetic field easily passes through them (for example, with an equivalent magnetic flux in each of the drums). The drum holder 42 is made of a non-ferromagnetic material to minimize the magnetic field passing through it, like an aluminum alloy, to reduce the inertia of the output rotor 40.

The drum holder 42 has a shaft interface 44 by which it is connected to a shaft 45. In an embodiment, the shaft interface 44 is a sleeve-like component that is rotationally coupled to the shaft 45, and may have wear sleeves 44A and 44B. The output rotor 40 is locked in rotation to the output shaft 45 by a key or any other locking device (splines, tight-fit, etc . . . ). A sealed shaft cap 46 is used to axially maintain the output rotor 40 relatively to the output shaft 45 and to prevent MR fluid leakage. A flat portion for a key may be defined on the output shaft 45 to ease screwing the shaft cap 46. This arrangement is one among others to connect the drum holder 42 to the shaft 45, such that the shaft 45 may receive the driving actuation from the input rotor 20 via the drum holder 42. The drum holder 22 further comprises throughbores 47 that may be circumferentially distributed therein to allow MR fluid circulation. As shown in FIGS. 3 and 4, the throughbores 47 are between the drums 41 and the shaft interface 44.

The MR fluid clutch apparatus 10 may use an odd number of drums 21 and 42, for example a mean value of about 7. More or fewer drums may be used according to the application. Using more than one drum helps to decrease the overall volume and weight of the MR fluid clutch apparatus 10 for a given desired torque and a given diameter, as using multiple drums helps to reduce both the drum length and the cross-sections of the inner magnetic core 20A and the outer magnetic core 20B. In the same time, the time response of the magnetic circuit may be improved because the Eddy currents are minimized when the cross-sections of the magnetic cores are lower.

Referring to FIG. 5, the magnetic field F induced by the coil 35 follows a closed path which goes through the annular wall 31B of the stator 30, the radial fluid gap 34B, the outer magnetic core 20B, the MR fluid, the drums 21 and 41, the inner magnetic core 20A, and the radial fluid gap 34A. The radial fluid gaps 34A and 34B allow the coil 35 to be energized without the use of slip rings. In fact, the typical friction slip rings are replaced by magnetic slip rings performed by the two radial fluid gaps 34A and 34B. The radial fluid gaps 34A and 34B are radial rather than axial for two reasons. Firstly, radial tolerance is readily reached so that the fluid gaps can be quite small (<0.2 mm) and thus the additional number of turns in the coil required to magnetize the fluid gaps 34A and 34B is minimized. Secondly, the magnetic attractive force in the fluid gaps 34A and 34B between the stator 30 and both magnetic cores 20A and 20B is nearly cancelled due to the rotational symmetry of the fluid gaps 34A and 34B. If the fluid gaps were axial, higher magnetic attractive forces would be present and would load the bearings axially.

Figure 6:
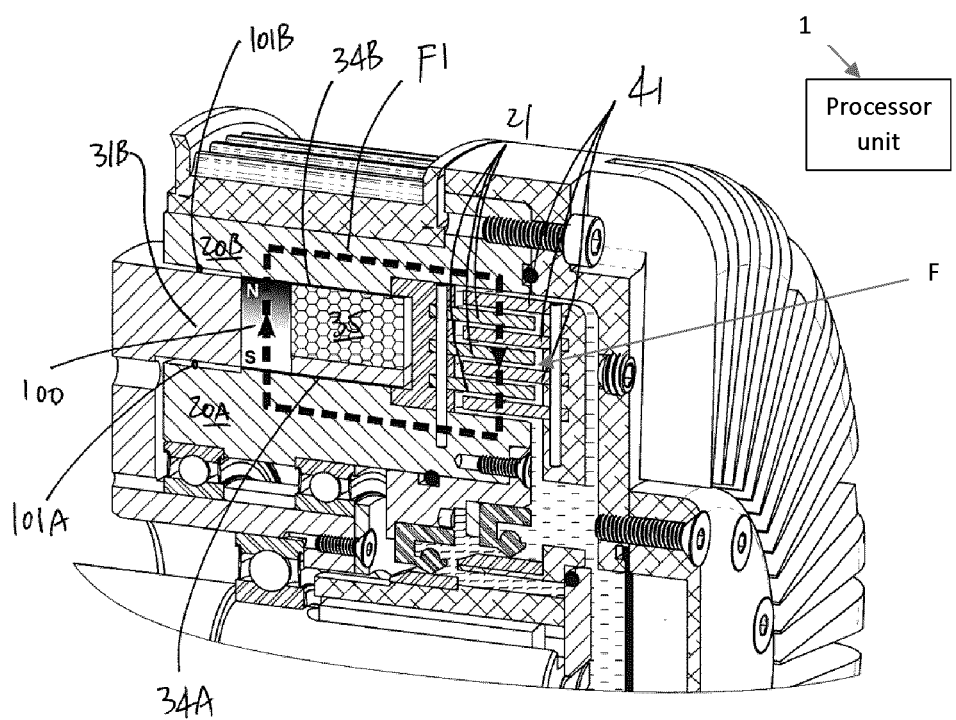
FIG. 6 is a partly sectioned view of the MR fluid clutch apparatus with a permanent magnet with a coil in an unpowered state, in accordance with the present disclosure.
Figure 7:
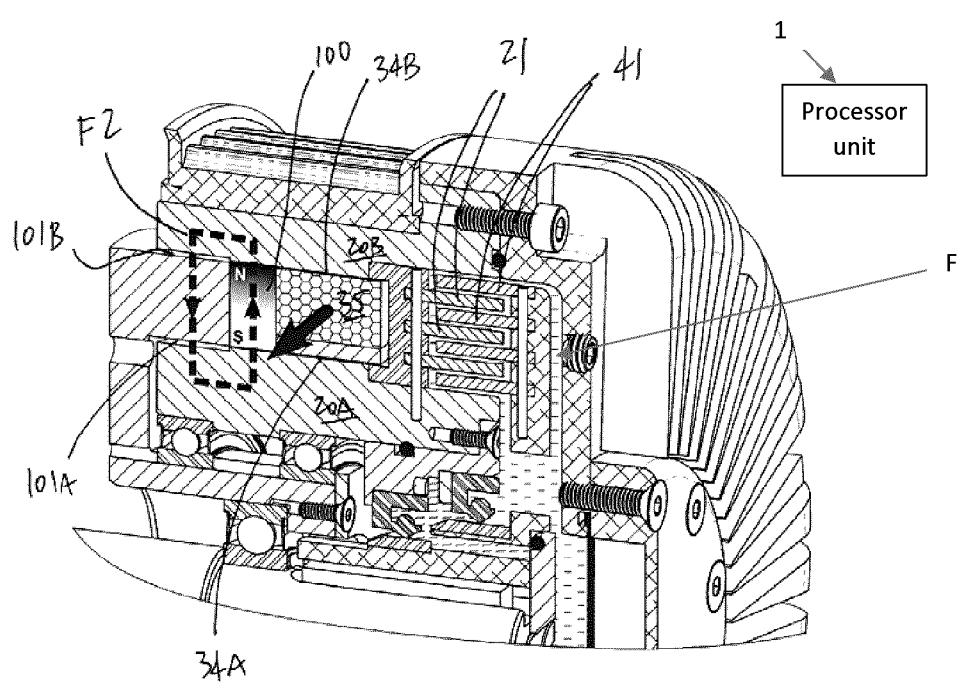
FIG. 7 is a partly sectioned view of the MR fluid clutch apparatus of FIG. 6, with the coil in a powered state.

Referring to FIGS. 6 and 7, the MR fluid clutch apparatus 10 is shown in yet another embodiment. The MR fluid clutch apparatus 10 of FIGS. 6 and 7 has numerous similar components with the MR fluid clutch apparatus 10 of FIGS. 3 to 6, whereby like elements will bear like numeral references, and their description is not duplicated unnecessarily herein. A distinction lies in the presence of a permanent magnet 100 in the outer annular wall 31B, in addition to the coil 35.

As shown in FIG. 6, permanent magnet 100 is used to generate a magnetic field F1 in the MR fluid clutch apparatus 10 so that the apparatus 10 can transfer a constant output torque without the need to apply a current via the coil 35. The permanent magnet 100 is radially magnetized and may be a full solid annular part or an assembly of individual magnets (such as cylindrical magnets). Other radial fluid gaps 101A and 101B, "redirection gaps", separate the part of the annular wall 31B on the opposite side of the permanent magnet 100 than the coil 35, from the inner magnetic core 20A and the outer magnetic core 20B.

When no current is applied to the coil 35, as in FIG. 6, magnetic field F1 is present in the MR fluid according to the described magnetic flux path shown. Some magnetic flux circulates through the other radial fluid gaps 101A and 101B, separating the stator 30 from the inner magnetic core 20A and the outer magnetic core 20B. These gaps 101A and 101B are a bit wider than the gaps 34A and 34B, the width being in a radial direction. The width of the redirection gaps 101A and 101B controls the amount of magnetic flux desired in the MR fluid, a.k.a. the desired constant torque when no current is applied to coil 35. If the redirection gaps 101A and 101B are sufficiently wide, almost all the magnetic flux induced by the permanent magnet 100 goes through the MR fluid, leading to a high DC torque. If the redirection gaps 101A and 101B are radially narrower, the magnetic flux is shared between the MR fluid and the redirection gaps 101A and 101B, leading to a lower DC torque.

When a current is applied in the coil 35 according to the direction shown in FIG. 7 and the indicated polarity of the permanent magnet 100, the magnetic flux induced by the permanent magnet 100 is redirected in the redirection gaps 101A and 101B as shown by F2, which leads in a decrease of the torque of the MR fluid clutch apparatus 10. At a certain intensity of the coil current, the magnetic flux F1 in the MR fluid can be nearly cancelled and passed this intensity, it will increase again. The width of the redirection radial fluid gaps also controls the size of the winding of the coil 35. If the width is high, a bigger winding is required to redirect the magnetic flux.

If the current is applied in the reverse direction, the coil 35 assists the permanent magnet 100 in the generation of magnetic flux in the MR fluid, leading to the increase of the torque of the MR clutch apparatus 10.

Accordingly, the MR fluid clutch apparatus 10 has a normally "on state" for the MR fluid, because of the magnetic field induced by the permanent magnet 100. The coil 35 may then be powered to cause the MR fluid clutch apparatus 10 to reduce torque transmission and eventually be in an off state. This arrangement is useful for example when the MR fluid clutch apparatus 10 must maintain torque transmission in spite of a power outage. The magnetic field of the permanent magnet 100 would be of sufficient magnitude for the MR fluid clutch apparatus 10 to support a load without being powered.

Figure 8:
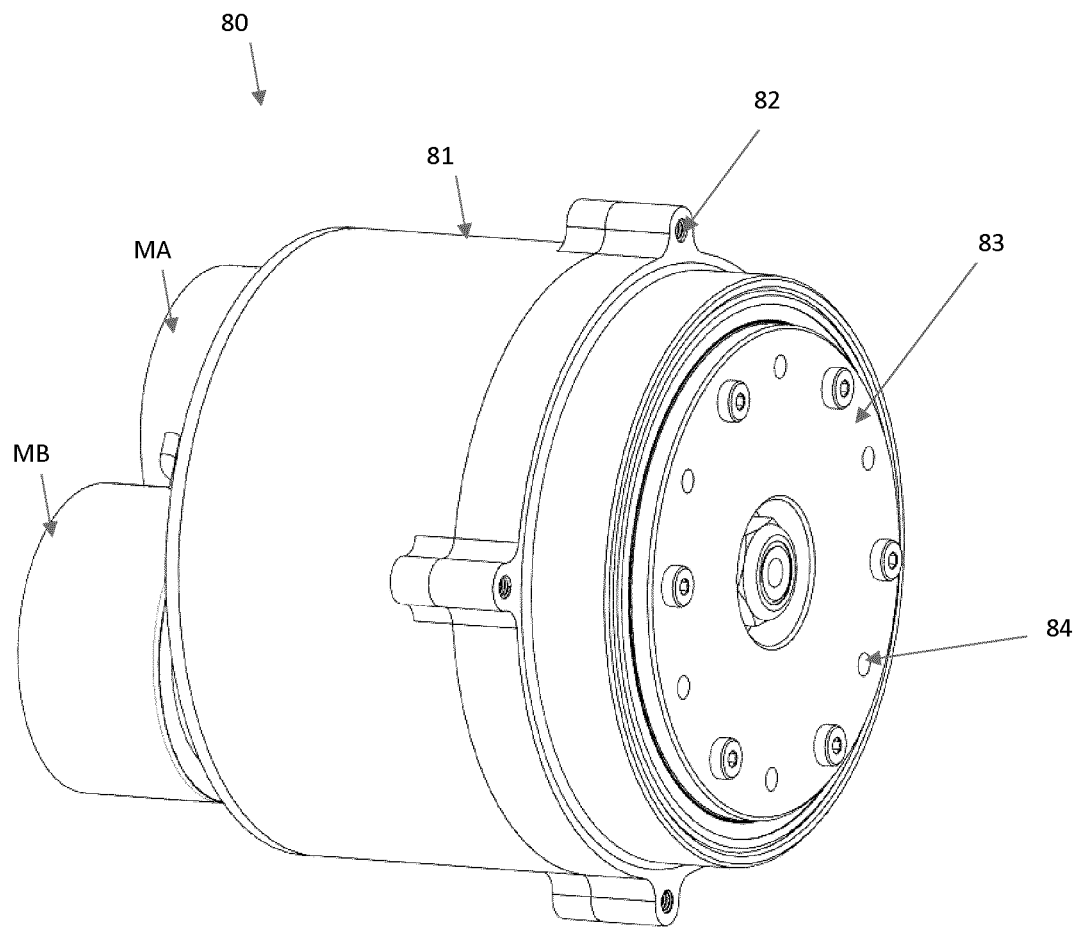
FIG. 8 is an embodiment of an MR actuation device using multiple MR fluid clutch apparatuses in accordance with the present disclosure.

Referring to FIG. 8, an embodiment of an MR actuation device 80 using multiple MR fluid clutch apparatuses of any of FIG. 1 to FIG. 7 is represented, with any one or any combination of the fluid clutch apparatuses of any of FIG. 1 to FIG. 7 being usable in the MR actuation device 80 and other devices described herein. For simplicity reason, the embodiment is illustrating a rotational robotic joint, but the same principle may be applied to other types or rotational devices or to a translational device. The described embodiment has two MR fluid clutch apparatuses 10A and 10B powered by two independent motors MA and MB but other embodiments may have additional MR fluid clutch apparatuses powered by additional motors. The motors MA and MB, and other motors used are of the bidirectional type. The MR actuation device 80 has an outer casing 81 that may be attached to a structure or robot member using the mounting holes 82. This is one way to secure the MR actuation device 80 to a structure, link, etc, others including integral connections, straps, etc. The MR actuation device 80 has a rotating joint output member 83 that may be attached to a second member by using the mounting holes 84. The mounting holes 84 may be threaded, keyed, etc. Other possibilities for the output member 83 include splined couplings, flanges, etc. In some embodiments, motor MA or motor MB may be of electrical type, with bi-directional capability (e.g., the motors can selectively rotate in both directions), although the motors can also be unidirectional. It is to be noted that MA and MB may be equipped with an internal braking device to brake their outputs. Braking devices in motor MA and MB may be of power-on or power-off type. Alternatively, the MR actuation device 80 may be equipped with an independent braking device of power-on or power-off type, or may rely on motor resistance to brake.

Figure 9:
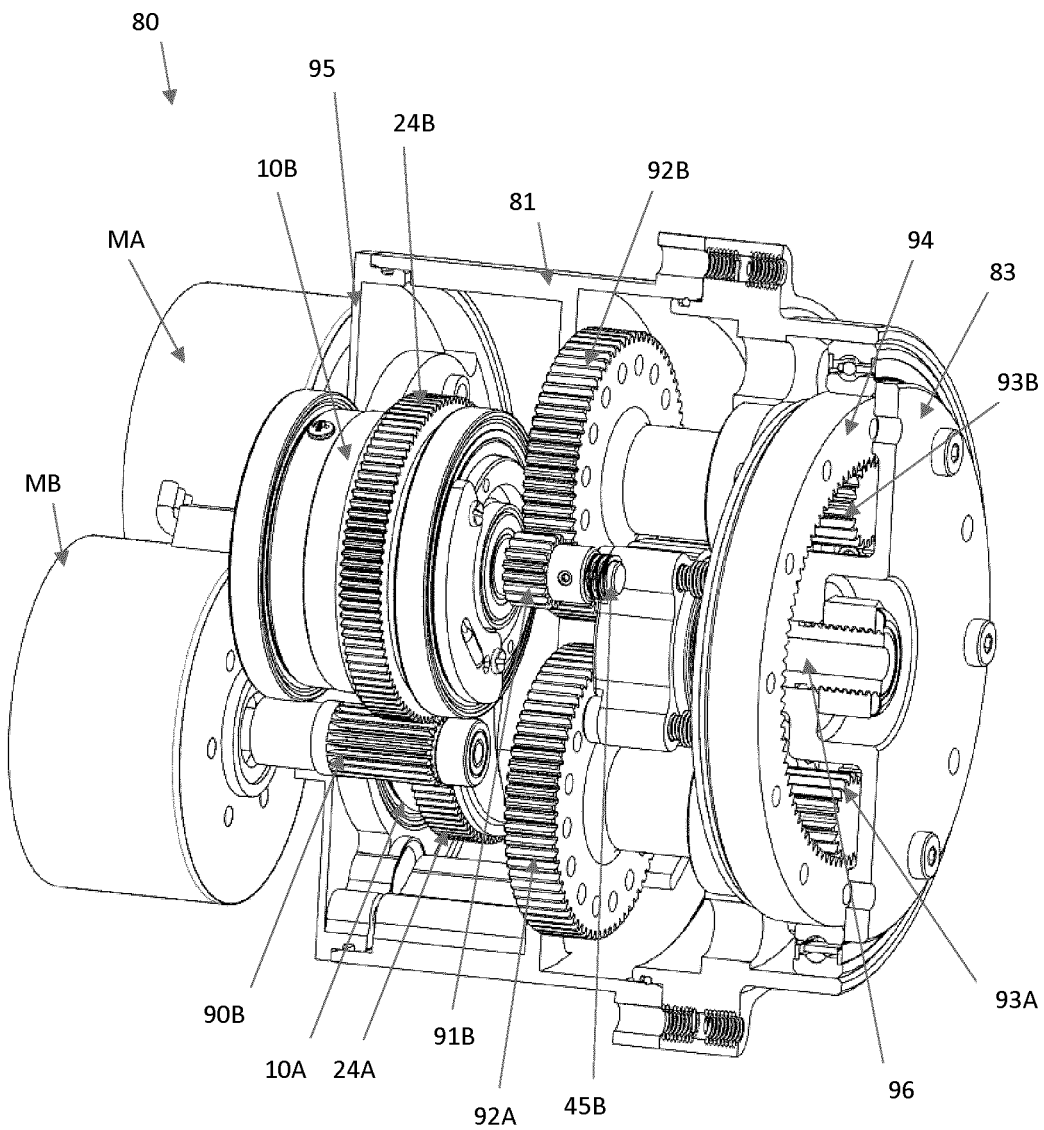
FIG. 9 is a perspective fragmented view of an interior of the actuation device of FIG. 8.
Figure 16:
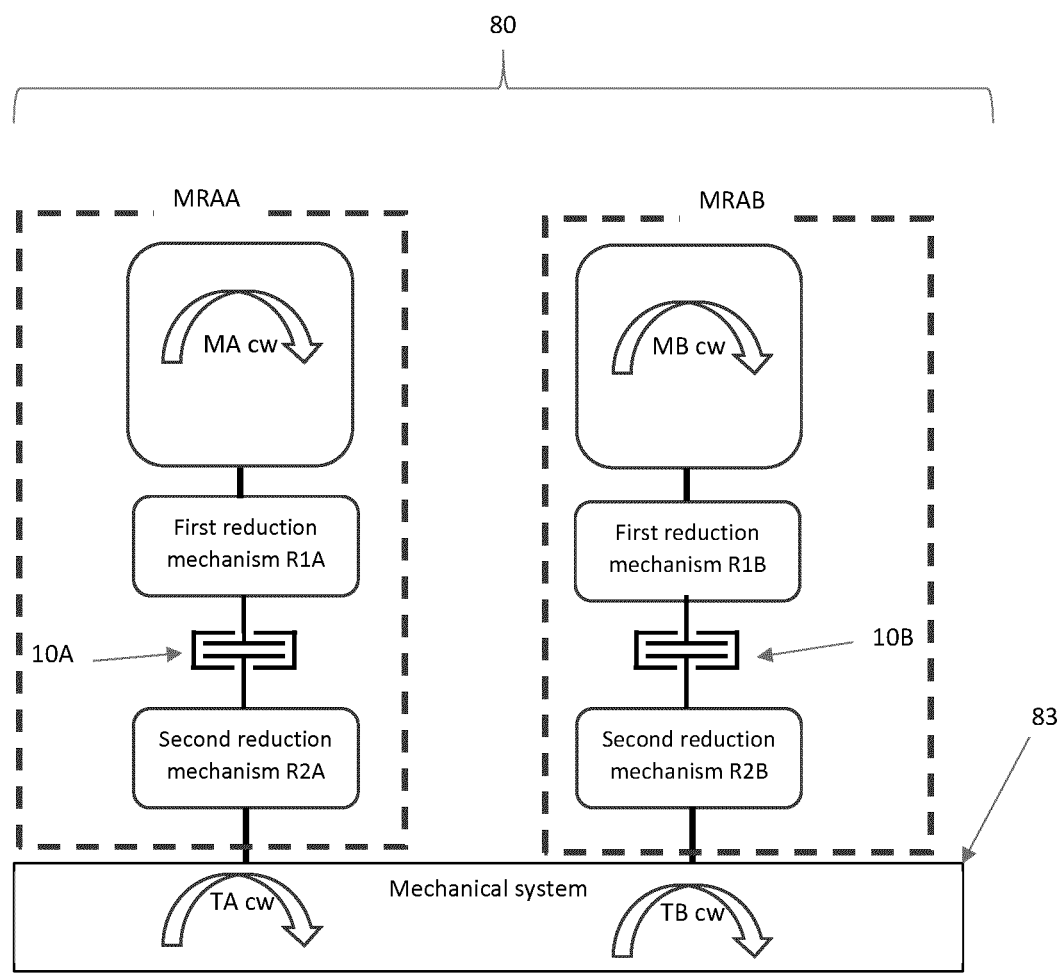
FIG. 16 is a schematic representation of the MR actuation device of FIG. 8 in high force/low bandwidth mode.
Figure 16:
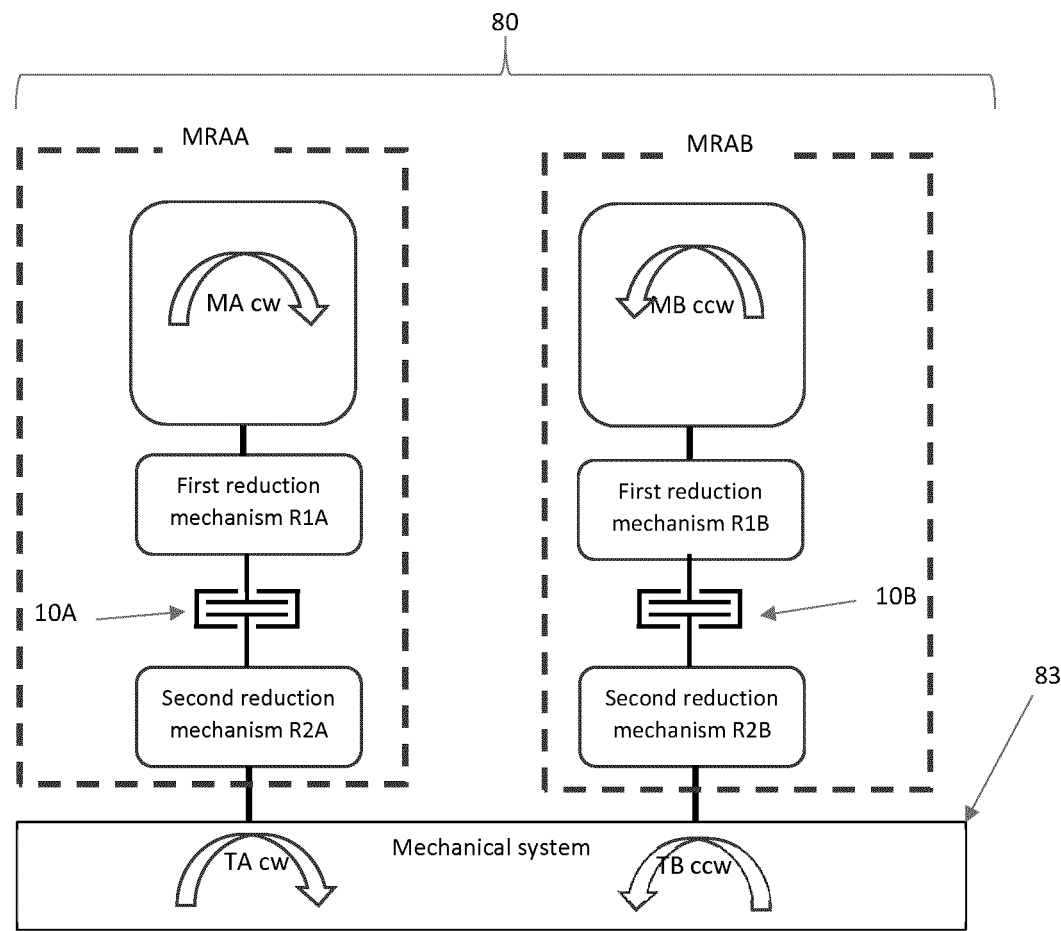

Referring to FIG. 9, there is represented an interior of the MR actuation device 80, with part of the casing 81 removed. Motor MA is connected to the cover 25 of the MR fluid clutch apparatus 10A using a gear type of connection and motor MB is connected to the cover 25 of MR fluid clutch apparatus 10B, the covers 25 being the input portions of the MR fluid clutch apparatuses 10A and 10B. The gear type connection is achieved by parallel spur gears as an option but other transmissions are possible, including pulleys and belt, sprockets and chain, etc. The housing of motor MA and MB may be attached to the actuation device cover 95 as a possibility. The gear output 90A (not shown) of motor MA may be connected to the gear portion 24A of MR fluid clutch apparatus 10A while the gear output 90B of motor MB may be connected to the gear portion 24B of MR fluid clutch apparatus 10B. In this embodiment, the motors MA and MB are connected directly to the MR fluid clutch apparatuses 10A and 10B, respectively, providing a first reduction ratio R1B in FIG. 10 superior to 1. In other embodiments, additional reduction mechanisms (i.e. planetary gearbox, belt reduction mechanism, infinite screw) may be provided between the motors MA, MB and MR fluid clutch apparatuses 10A and 10B, though optional. In the embodiment, the output shaft (not shown) of the MR fluid clutch apparatus 10A is connected to an output gear (not shown) while the output shaft 45B of the MR fluid clutch apparatus 10B is connected to an output gear 91B (45B and 91B being visually equivalent to those of the MR fluid clutch apparatus 10A). The output gear of the MR fluid clutch apparatus 10A may be connected to another gear 92A while the output gear 91B may be connected to another gear 92B, providing a stage of reduction ratio downstream of the MR fluid clutch apparatuses 10A, 10B, being identified as the second stage of reduction R2B in FIG. 10. A third stage of reduction R3B may be added, as shown on FIG. 10, consisting of gear 93A and 93B connected to the output gear 94. Fewer or more stages of reduction may be present, with gear systems, or other types of reduction arrangements. Therefore, the MR actuator device 80, which may be used as a robotic joint, is composed of two independent MR actuator units each featuring its dedicated motor MA, MB, a MR fluid clutch apparatuses 10A, 10B respectively, and a transmission for example in the form of a reduction mechanism. The MR actuators are connected to the same robotic joint output member 83. Each of the two MR actuator units has a low inertia MR fluid clutch apparatus, whereby the reflected inertia transmitted to the mechanical system via the output member 83 may be lower than if no MR fluid clutch apparatus were used. Moreover, the advantage of having a system with independently (each actuator unit has its own motor) controlled MR actuator units MRAA and MRAB (as represented in FIG. 16) both having MR fluid clutch apparatuses with low inertia will help to maintain weight and inertia at the output to a lower level than if a system were composed of a single motor with double the capacity combined with two antagonistically MR fluid clutch apparatuses, each with increased capacity (e.g., doubled), hence with increased inertia and weight. The reduced weight of the configuration where two smaller MR fluid clutch apparatuses are used may also contribute to reduce the size and weight of the MR actuator device, hence contributing to reduce the weight of the mechanical assembly and/or to reduce the inertia of the mechanical assembly itself. In order to lower the weight for a given torque, a system may have two MR fluid clutch apparatuses per DOF, as in the case for the MR actuator device 80 FIGS. 9-12 with 10A and 10B, each driven by independent motors (e.g., MA, MB) and coupled to a rigid link able to transmit bi-directional force. Each independent MR actuator unit, e.g., MRAA and MRAB may also allow different modes of operation than if not independently controlled. An electronic controller (such as 1 in preceding figures, usable in the MR actuator device 80 FIGS. 9-12) may be embedded in the MR actuation device 80 and a wire passage 96 (FIG. 9) may be used to route wire(s) to reach the motors MA and MB, the coils 25 of MR fluid clutch apparatuses 10A and 10B as well as other integrated sensors like Hall effect, torque sensor, position sensors, inertia sensor, temperature sensor, only to name a few.

Figure 10:
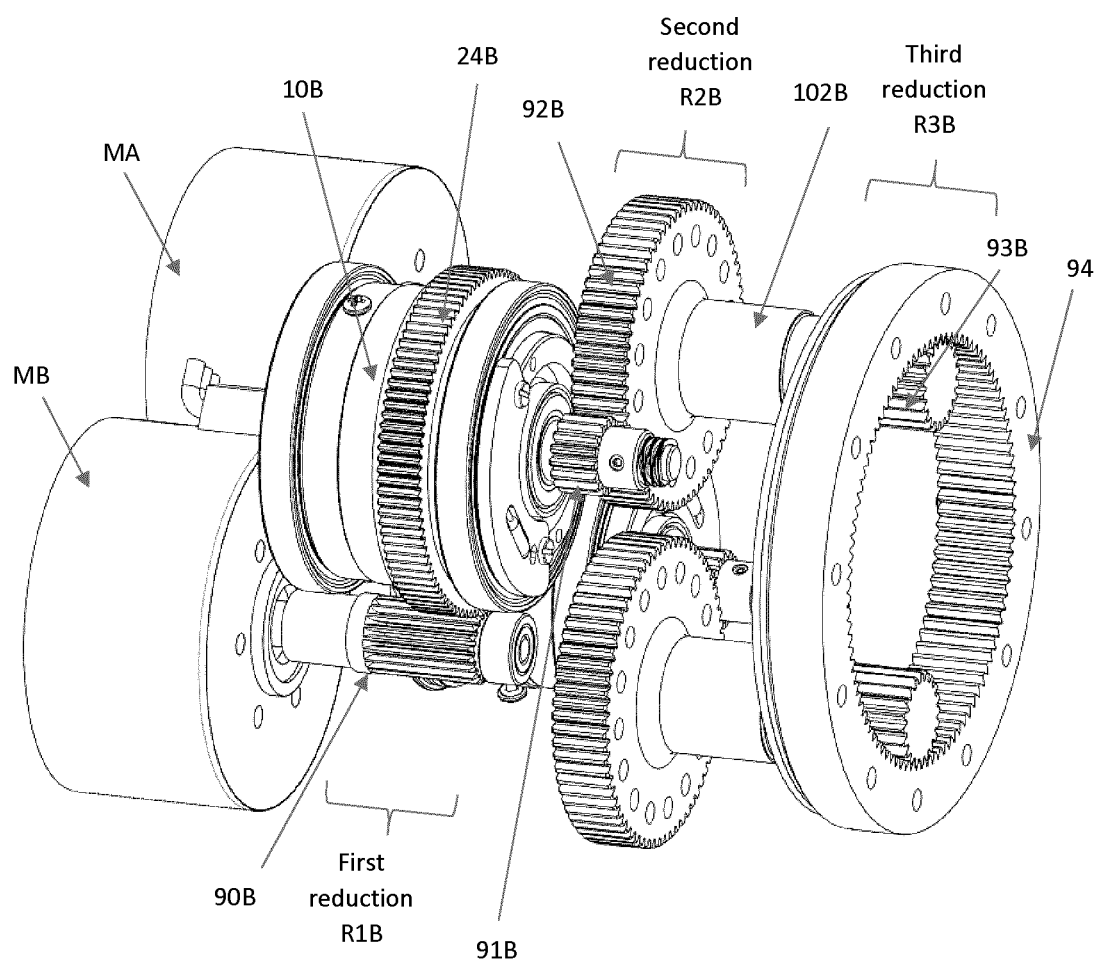
FIG. 10 is a simplified representation of a kinematic chain of the MR actuation device of FIGS. 8 and 9.
Figure 11:
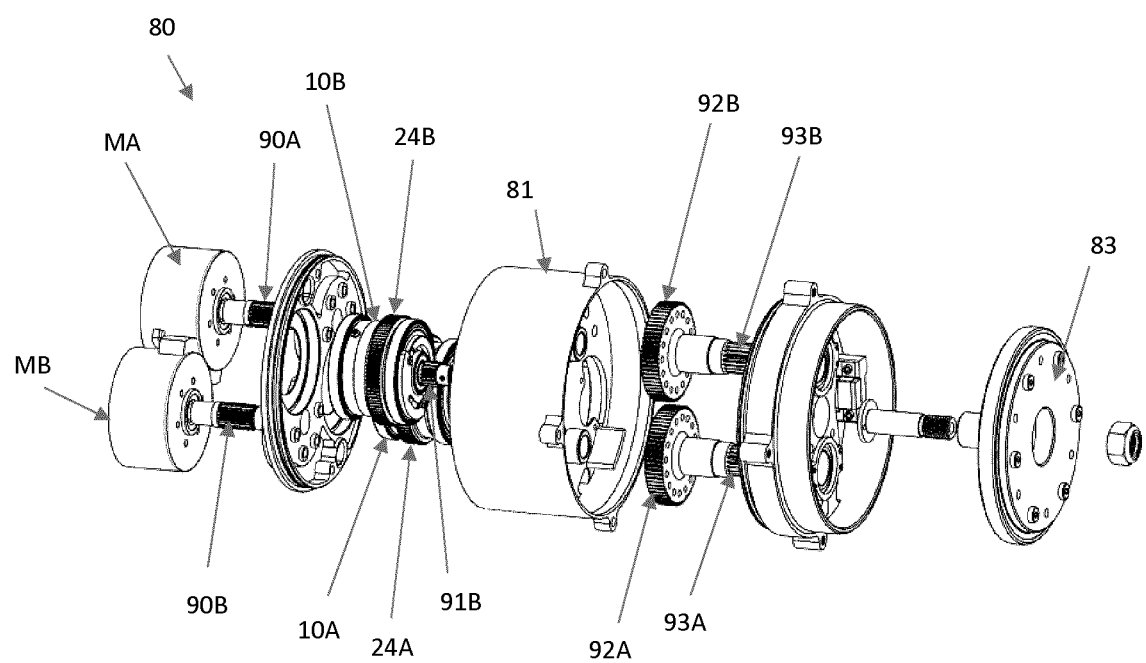
FIG. 11 is an exploded view of the MR actuation device of FIG. 8.
Figure 12:
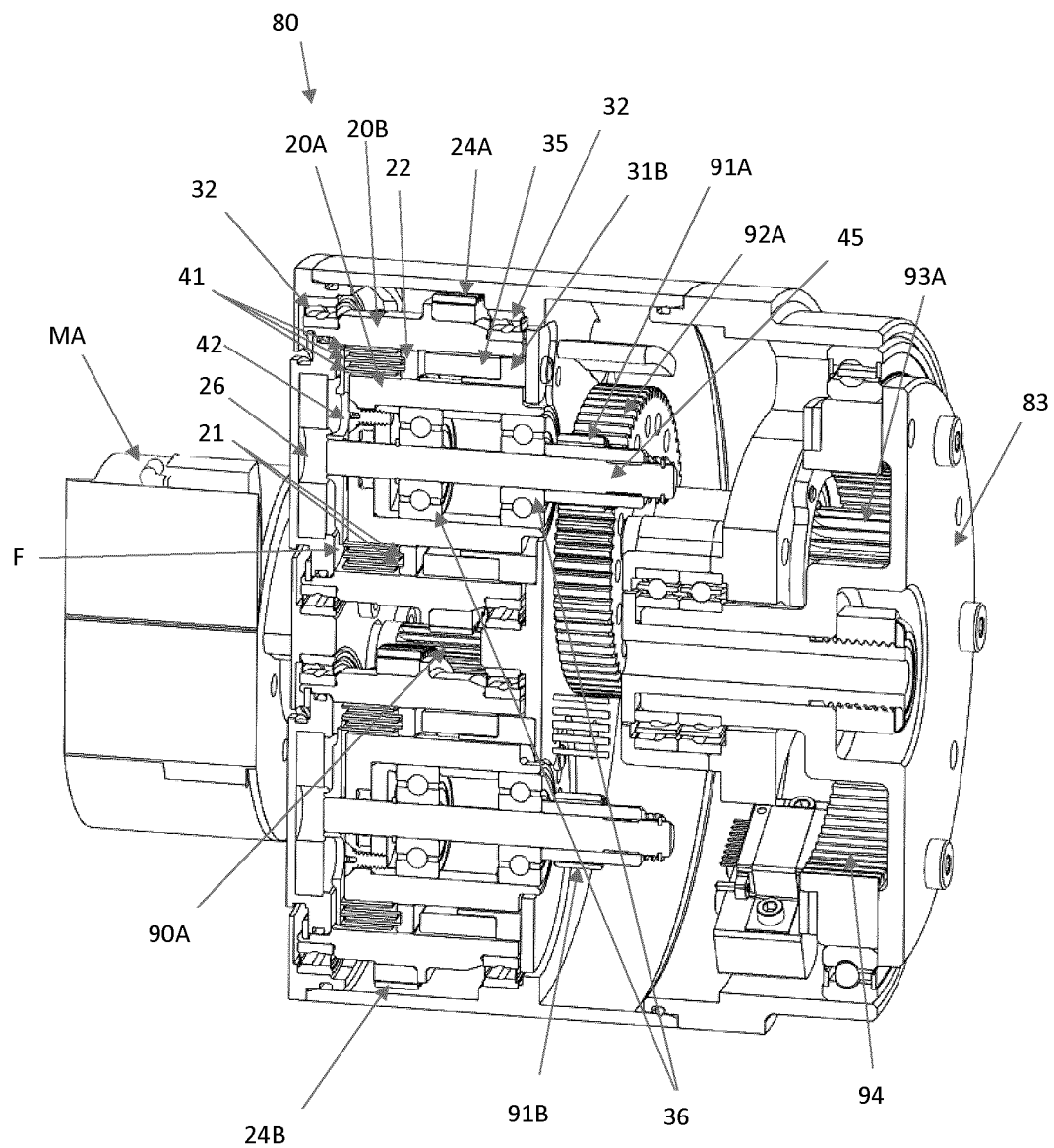
FIG. 12 is a perspective sectional view of the MR actuation device of FIG. 8.
Figure 13:
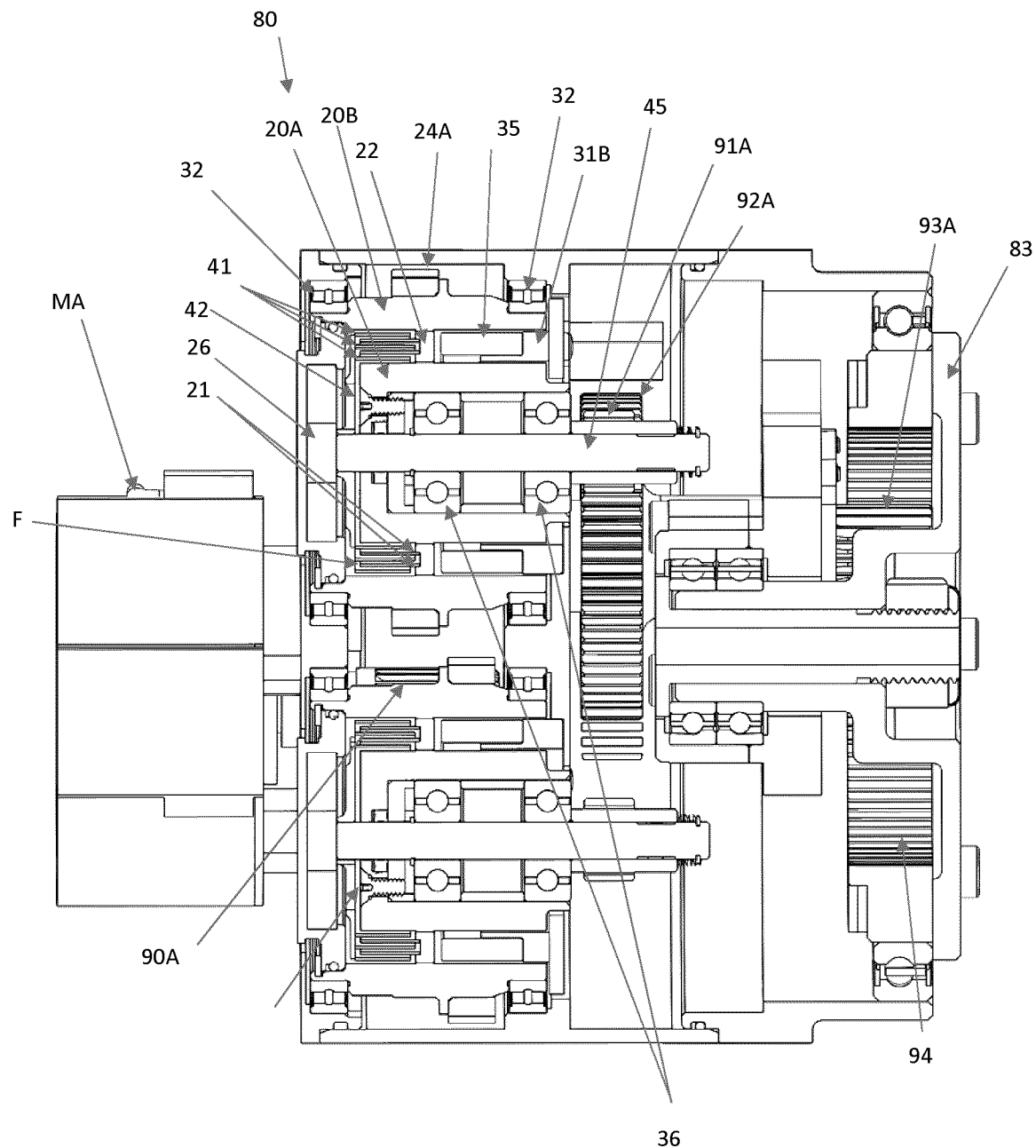
FIG. 13 is an cross-sectional view of the MR actuation device of FIG. 8.

FIG. 10 is a simplified representation of the MR actuator device 80 of FIG. 9, while FIG. 11 is an exploded view of the actuation device 80, and FIG. 12 is a perspective cut-off view of the actuation device 80. A kinematic chain of the MR actuator unit MRAB with the associated components, i.e., with structural components removed, may be viewed therein in greater details. When engaged, the MR fluid clutch apparatus 10B may transmit the torque generated by the Motor MB to the output gear 94, the output gear 94 being of the internal gear type. The kinematic chain may then be composed of the motor MB, the gear output 90B, the gear portion 24B of MR fluid clutch apparatus 10B, the output gear 91B that may be connected to the gear 92B (forming the second reduction R2B). Gear 92B may then be connected to output gear 93B by a shaft 102B and may then be connected to output gear 94, with the output gears 93B acting as a pinion to the internal gear 94, though this is merely an option among others. Similarly but not shown fully shown, the kinematic chain of the actuator unit MRAA may be composed of the motor MA, the gear output 90A (FIG. 11), the gear portion 24A of MR fluid clutch apparatus 10A, the output gear 91A that may be connected to the gear 92A (forming the second reduction R2A). Gear 92A may then be connected to output gear 93A by a shaft 102A and then may be connected to output gear 94. Therefore, both MR actuator units MRAA and MRAB have the output gear 94 as common output (i.e., a shared output, a single output for all MR actuator units). It is to be noted that many of those components may be combined is a single component. Gear 92B, shaft 102B and output gear 93B may consist in a single part, as an example among others. In the embodiment of FIGS. 9 to 13, spur gear reduction systems are shown but other types of reduction mechanism may also be used like helical, worm, friction, magnetic, belt, chain only to name a few. In FIGS. 8 to 13, the MR actuator units MRAA and MRAB are illustrated with corresponding components of the same sizes (e.g. MR fluid clutch apparatus 10A is shown with the same dimension than MR fluid clutch apparatus 10B). However, the MR actuator units MRAA and MRAB or any one of more of the components composing the MR actuator units MRAA and MRAB may be of different sizes, when comparing the MR actuator units MRAA and MRAB. For example, the MR actuator unit MRAA may be dimensioned for higher torque or speed than the MR actuator unit MRAB. The MR fluid clutch apparatus 10A may be of different dimension than the MR fluid clutch apparatus 10B. Such arrangement may be desired for example when the MR actuator unit MRAA is used to compensate for gravity of a robotic arm while the MR actuator unit MRAB is only used to apply a force on a surface. It may be understood that the gearing of the MR actuator units MRAA and MRAB may not have the same reduction ratio nor the same number of reduction levels. For example, the MR actuator unit MRAA may have a first reduction R1A, a second reduction R2A and a third reduction R3A, while the MR actuator unit MRAB may only have a first reduction R1B and a third reduction R3B, the output gear 91B connected directly on the shaft 102B. These are examples among others to show that the MR actuator units MRAA and MRAB may differ from one another, in possible torque output, is speed, reduction ratio, etc.

In the embodiment of FIGS. 9 to 13, MR fluid clutch apparatuses of normally open type similar to FIG. 3-5 are used, as an option. The MR actuation device 80 may then be free to rotate in power-off mode (no power applied to MR clutch apparatus coils). It is to be noted that reduction mechanisms are supported by bearings but not described in detail for simplicity. The casing 81 may integrate bearing supports and bearings, including by using a casing cover 81A for rotatably supporting the rotating components of the MR actuator units MRAA and MRAB, as observed in FIGS. 9 and 13, for example.

Figure 14:
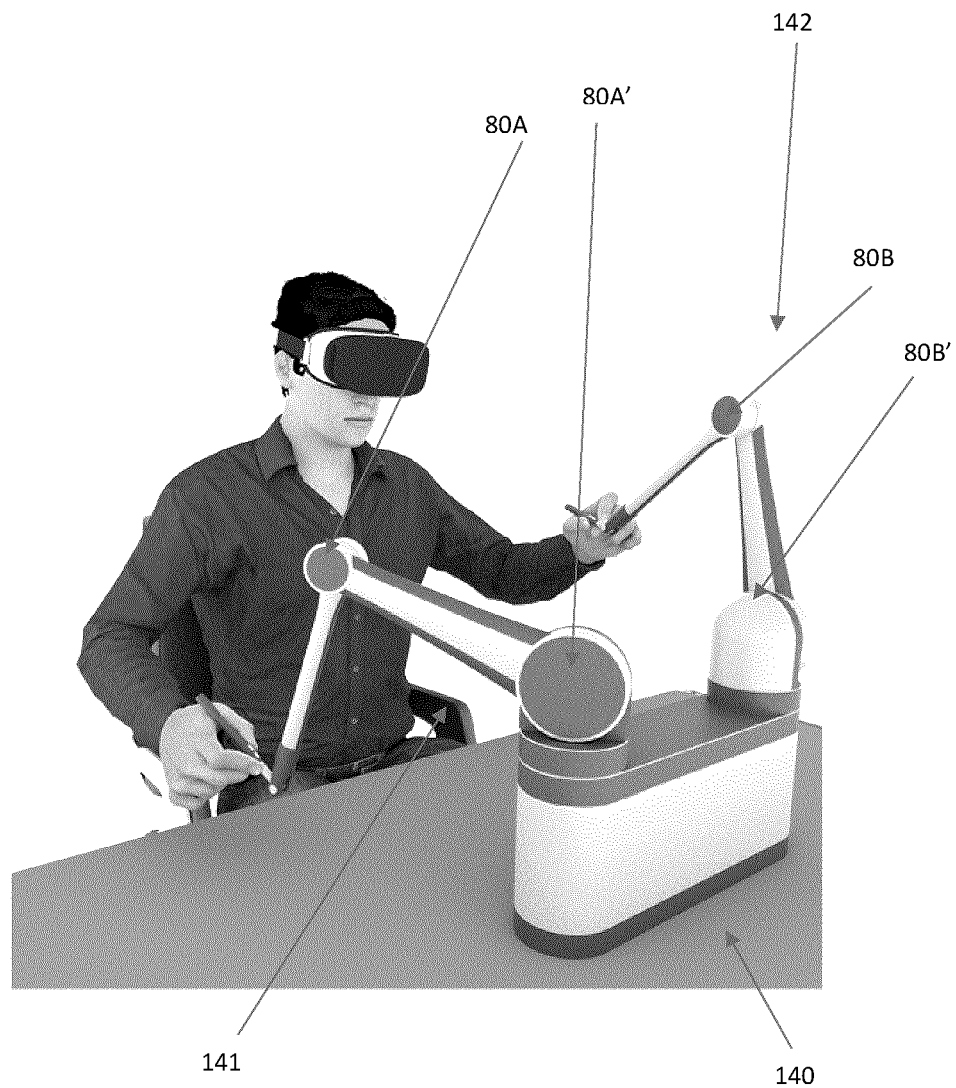
FIG. 14 is a schematic representation of the MR actuation device of FIG. 8 used in a robotic arm.

FIG. 14 is a schematic representation of multiple actuation devices 80 (shown as 80A, 80A', 80B, 80B') used in an haptic robotic arm system 140. MR actuation device 80A and 80A' actuate a first haptic arm 141 and MR actuation device 80B and 80B' actuate a second haptic arm 142, with the MR actuation devices 80 being actuated joints between links.

Figure 15:
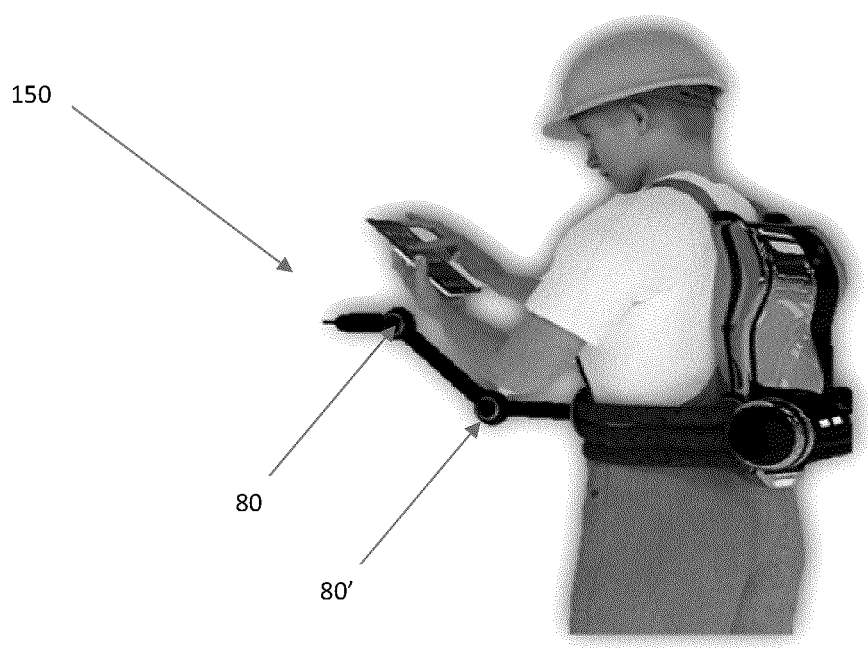
FIG. 15 is a schematic representation of the MR actuation device of FIG. 8 used in a wearable robotic arm.

FIG. 15 is a schematic representation of multiple MR actuation devices 80 used in a wearable robotic arm 150. In the configuration, MR actuation devices 80 and 80' each provide a degree of freedom in order to achieve a wearable arm of multiple degrees of freedom, the MR actuation devices 80, 80' being actuated joints between links.

FIGS. 16 and 16' are schematic representations of the MR actuation device 80 to illustrate modes of control. The MR actuation device 80 has the two MR fluid actuator units MRAA and MRAB both connected to the same joint output member 83 that may be used in multiple modes. In FIG. 16, the MR actuation device 80 is represented as working in a collaborative mode. In the collaborative mode, both the motors MA of MRAA and MB of MRAB are operated to provide torque to the common output 83 in the same direction and the torque resulting on the robotic joint output member 83 will be the sum of the torque generated by the MR actuator unit MRAA and by the MR actuator unit MRAB, respectively controlled by the MR fluid clutch apparatuses 10A and 10B. The system could be arranged for the motors MA and MB to turn in opposite directions, but still collaborate by their transmission arrangement with the output member 83 for the torque on the output member 83 to be the sum of the torque generated by MRAA controlled by the MR fluid clutch apparatus 10A and the torque generated by MRAB controlled by the MR fluid clutch apparatus 10B. In FIG. 16 where both the motors MA and MB are turning in the clockwise (CW) direction, the torque generated on the output member 83 (e.g., used as a robotic joint) will also be CW. Optionally, a first reduction mechanism R1A is placed between the motor MA and the clutch 10A and a second reduction mechanism R2A is placed between the clutch 10A and the robotic joint output member 83, though more or fewer reduction mechanisms could be present. Also, a first reduction mechanism R1B is placed between the motor MB and the clutch 10B and a second reduction mechanism R2B is placed between the clutch 10B and the robotic joint output member 83, though more or fewer reduction mechanisms could be present. In some other embodiments, any or all reduction mechanisms R1A, R2A, R1B and R2B may be eliminated. Additional reductions mechanism may also be added to any of the reduction mechanism to increase the reduction ratio. Additional reduction mechanism(s) may also be added after robotic joint output member 83 (i.e. between robotic joint output member 83 and robot member link). All reduction mechanism may be of any type that allows the speed of the input to turn at a different speed (slower or higher) than at the output. Reduction mechanisms may be of any type, or a combination of any type. In high force/low bandwidth mode, where both MR actuator units MRAA and MRAB are turning in the same direction (i.e. clockwise direction) the torque of both MRA1 and MRA2 may be added to reach highly controllable high torque in a single direction (i.e clockwise). In FIG. 16', there is represented an antagonistic mode where MR actuator units MRAA and MRAB are turning in opposite directions (i.e. MR actuator unit MRAA is turning clockwise and MR actuator unit MRAB is turning counterclockwise). In this mode, the MR actuator units MRAA and MRAB may each provide a highly controllable torque in two opposite directions. In low force/high bandwidth mode, the maximum attainable torque of the system may be less than the torque that is attainable in high force/low bandwidth mode (i.e., the collaborative mode). However, the torque reversal bandwidth in the antagonistic mode may be superior than in the collaborative mode because the motors MA and MB of the MR actuator units MRAA and MRAB do not have to change rotational direction in order to provide a torque in two opposite directions at the robotic joint output member 83. Stated differently, if one of the motors were to change direction in the collaborative mode to transition into antagonistic mode, bandwidth would be reduced, i.e., the reversal of torque would not be as fast. In each mode, the maximum torque limit and the maximum speed limit of each MR actuator unit MRAA and MRAB may be adjusted independently. This may provide the ability to adjust the performance of the MR actuation device 80 in each direction independently, in relation to the conditions or a larger control algorithm or sensors, hence becoming a State dependant mode. Stated generally, the collaborative mode sees forces of two or more sources applied in a common direction or vector on an output, whereas an antagonistic mode sees forces of two or more sources applied in antagonistic fashion on the output (i.e., sequentially in different directions), with MR fluid clutch apparatuses 10 contributing to the torque transmission, and controller 1 operating the system to control mode selection. The system is explained herein with respect to an exemplary use with robotic joints, but the MR actuation device 80 may be coupled to any type of mechanical output. It may be coupled to a rotation-to-rotation converter (e.g. gears, pulley, sprocket, linkages or other types of rotary mechanical devices) or a rotation-to-linear converter (e.g. screw, ball screw, rack and pinion r other types of linear mechanical devices) or a combination of both (e.g. a pulley acting on a cable or belt that pulls on a sliding mechanism, a ball screw acting or a rotational joint or other types of combined mechanical devices).

Figure 17:
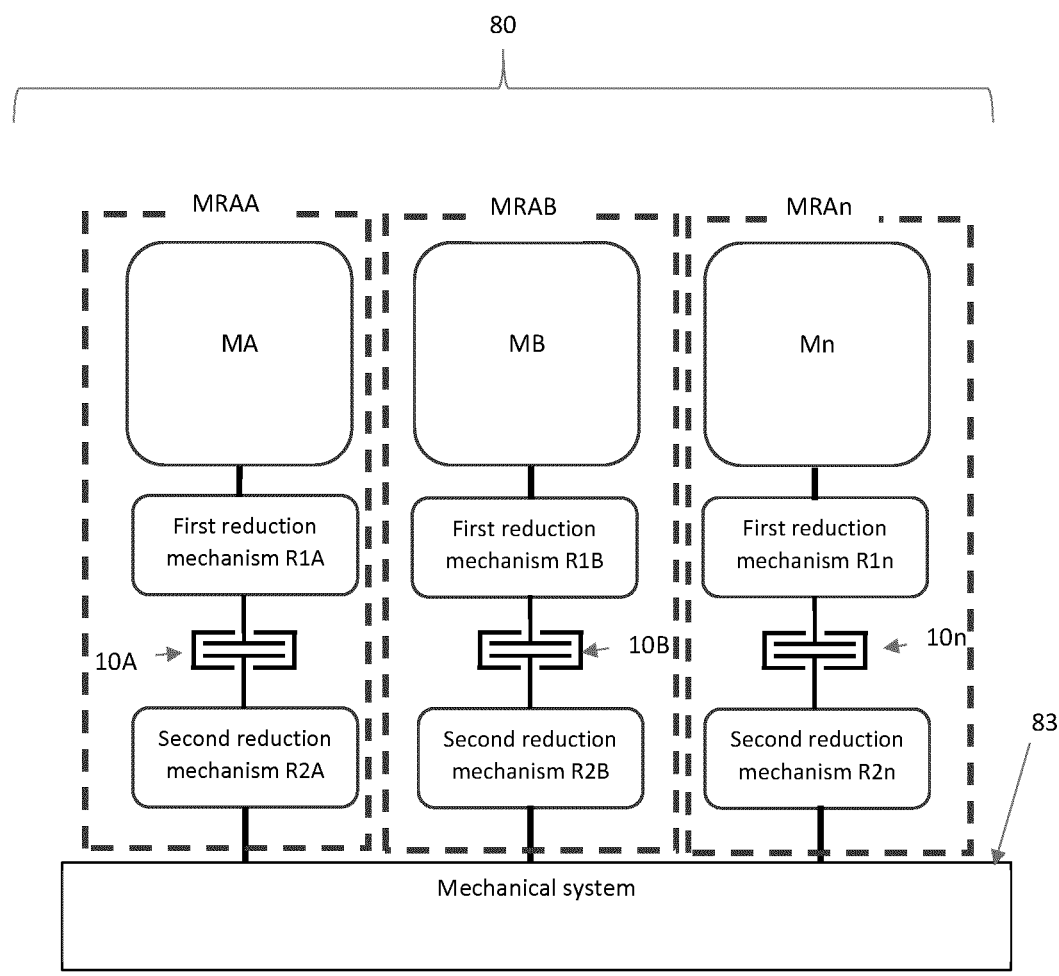
FIG. 17 is a schematic representation of the MR actuation device of FIG. 8 composed of more than two MR fluid clutch apparatuses.

FIG. 17 is a of the MR actuation device 80 composed of n MR actuator units. In this configuration, multiple MR actuator units MRA are connected to the same joint output member 83. The torque generated the actuation device output member 83 on the robot member (not shown) is the sum of the torques (positive or negative) generated by all MR actuator units. As an option, two of the motors are bi-direction, and motors of other MR actuator units may be unidirectional, if such motors are only used in antagonistic mode. Depending on the conditions, multiple MR actuator units may cooperate to apply a force in the desired direction. Multiple MR actuator units may be reorganised (motor can change direction) in order for the system to act or be ready to react to outside force. The number of MR actuator units cooperating to generate a force in a desired direction may be changed in real time, allowing the MR actuator device 80 (e.g., at the robotic joint in an example) to rapidly change its impedance characteristics. Different arrangements can be reached: two MR actuator units MRAs collaborating in a collaborative mode, and a third MR actuator unit being in antagonistic mode, for example, all MR actuator units summing up their torques in a collaborative mode.

Figure 18:
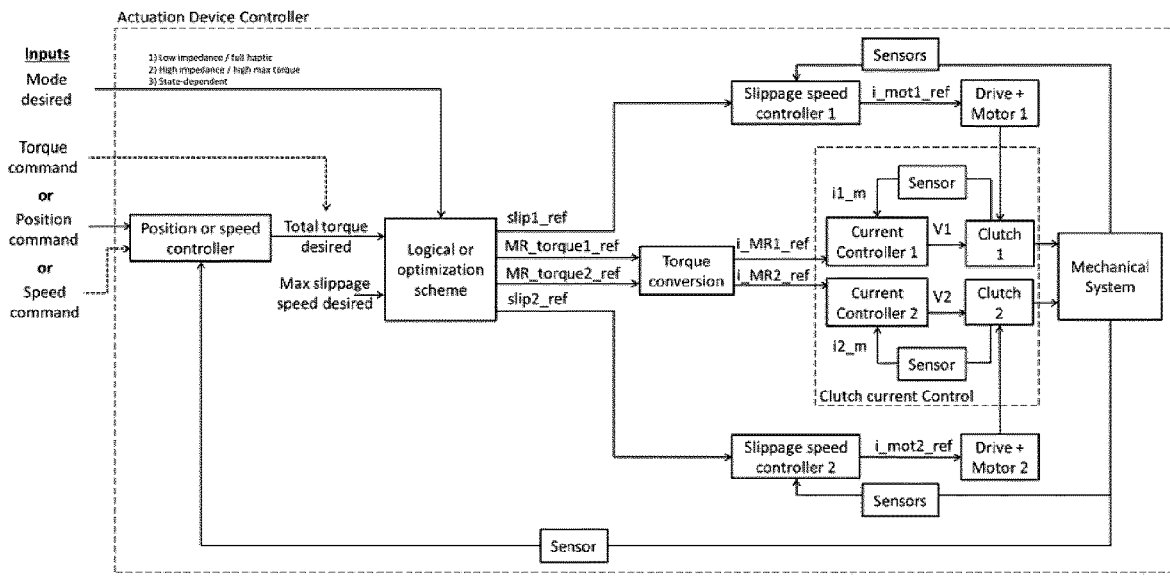
FIG. 18 is a schematic representation of a controller for two MR fluid clutch apparatuses controlling the MR actuation device in when the two MR fluid clutch apparatuses are maintained in slippage.

FIG. 18 is a schematic representation of a controller of two MR actuator units controlling the MR actuation device (e.g., 80) when two MR clutch apparatuses are maintained in slippage. The controller may be used as controller 1 in the figures. In this situation, input drums 21 are turning faster than output drum 41 for the clutches 10 to be maintained in slippage or continuous slippage. In this situation, the torque transmitted by the system is controlled by the current transmitted to the coil 35 of the MR fluid clutch apparatuses. With this controller, many sub-modes are possible. A first mode possible is the antagonistic mode when the two MR actuator units are turning in opposite directions as shown on FIG. 16' (or apply antagonistic forces on the output) and where backlash of the system is reduced because of the antagonistic nature of the forces generated on the mechanical system. A second mode of operation is the collaborative mode where the two MR actuators are turning in the same direction as shown on FIG. 16 (or apply forces in a common direction or orientation on the output). In this mode, higher torque may be possible, and backlash of the system may be present as both motors are applying a force in the same direction. A third mode is possible where on MR actuator is maintained in slippage and where the other actuator is maintained in another mode (i.e. off mode, locked mode or braking mode). As the system may be fully controllable, it is possible to switch from one mode or one sub-mode to another very rapidly, by operation of the controller 1. In example, it would be possible to have the system to operated in collaborative mode to perform an operation in one direction and if a direction change is required, switch to antagonistic mode for the direction transition in order to momentarily eliminate the backlash effects of the direction transition and then return to collaborative mode to accelerate a robot member. Also, a controller for two MR actuators is shown but controller having additional MR actuator or actuators is also possible. When multiple MR actuators are cooperating one with each other, the result may be a system may still be operable in the various mode and sub-modes explained and the mechanical system will benefit from added flexibility in relation to the force that may be generated in one direction or another. Depending on how many MR actuators are cooperating to provide a force in one direction VS the other direction, the system may then have non-symmetrical performance capabilities. Indeed, with a three MR actuators system of equivalent capability (torque, speed, . . . ), if two MR actuators are ready to provide a force in one direction (i.e. CW) and if one MR actuator is ready to provide a force in the antagonistic direction (CCW), the torque capabilities in the CW direction may be twice the capability then in the CCW direction. Moreover, if the multiple MR actuator system is composed of MR actuators of different capabilities (torque, speed, power, . . . ) it may be possible to select the actuator or actuators adjustments to benefit of added sub-modes not described in herein. The system according to perform the operation needed. The system with more than two or more MR actuators may benefit from a redundancy level.

Figure 19:
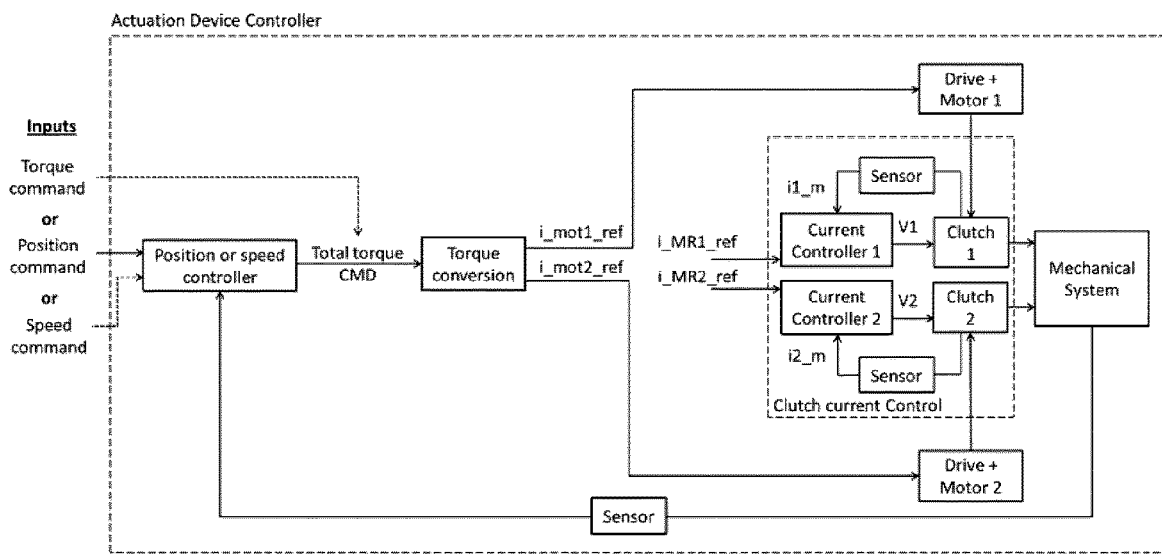
FIG. 19 is schematic representation of a controller for two MR fluid clutch apparatuses controlling the MR actuation device when the two MR clutch apparatuses are maintained in a lock mode.
Figure 20:
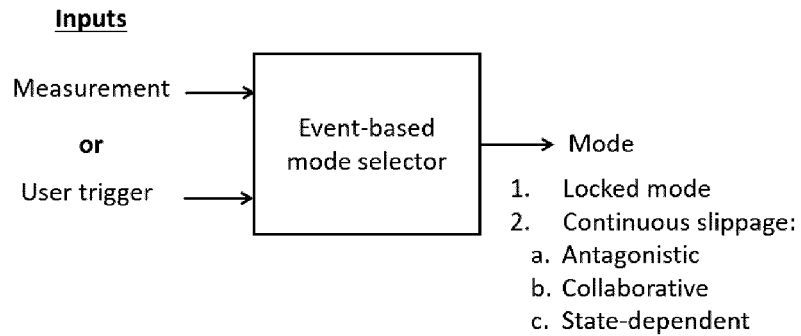
FIG. 20 is a schematic representation of an event-based selector that may be used to determine the desired mode of the MR actuation device.

FIG. 19 is schematic representation of a two MR actuators controller that is controlling the actuation device when the two MR clutch apparatuses are maintained in lock mode. In this mode, the current in coil 35 is adjusted to have a torque transmitted by the MR fluid clutch apparatuses 10 to be lower than the maximum transmittable torque by the MR fluid clutch apparatuses so the input drums 21 are at the same speed than the output drums 41 for the clutches 10 to be maintained locked mode (no slippage). In this locked mode, the torque transmitted by the actuation device is controlled by the current generated by the motor. Again here, a controller with two MR actuators is shown but additional MR actuators may be added. In this locked mode, only one MR actuator may be used to control the torque transmitted to the mechanical system. It is also possible to use two or multiple MR actuators to cooperate in order to generate the force on the mechanical system. The locked mode where one or multiple MR actuators are generating the torque on the system may limit the slippage in the MR clutches apparatuses 10 and reduce the energy dissipated in the MR fluid F. This locked mode may be useful to increase the durability of the fluid F in the various MR fluid apparatuses 10, FIG. 20 is a schematic representation of an event-based selector that may be used to determine the desired mode of the system. The even-based selector may be a module in the form of non-transitory computer readable instructions executable by a processor of the controller 1. Depending on the condition of utilisation and the desired behavior of the mechanical system, the various MR fluid actuator may be switched from one mode (antagonistic or collaborative or locked modes) and to various sub-modes (antagonistic, collaborative and state-dependant) very rapidly. This allows the system to be very versatile in terms of controllability. The controller 1 may operate the event-based selector using the signals from numerous sensors applied to the various components of the system.

Figure 21:
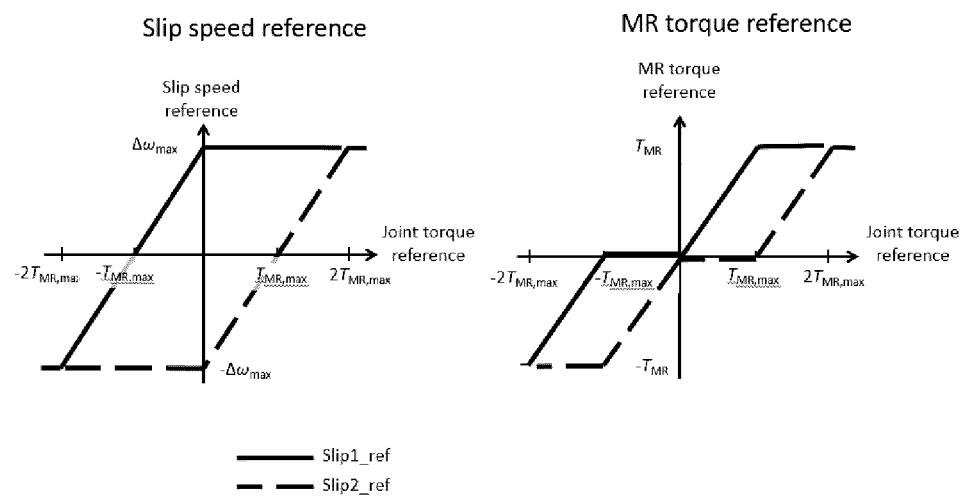
FIG. 21 is a schematic representation of the slip speed and MR torque reference of the MR actuation device of FIG. 18.

FIG. 21 is a simplified representation of one possible (amongst other) solutions to produce an event-based selector. In FIG. 21, slip speed command Slip1_ref, Slip2_ref and MR torque reference of the controller of FIG. 18 are used to transition between antagonistic mode and collaborative mode when the required Torque $T_{MR}$ is higher than the $T_{MR\ max}$ of a single MR actuator.

Figure 22:
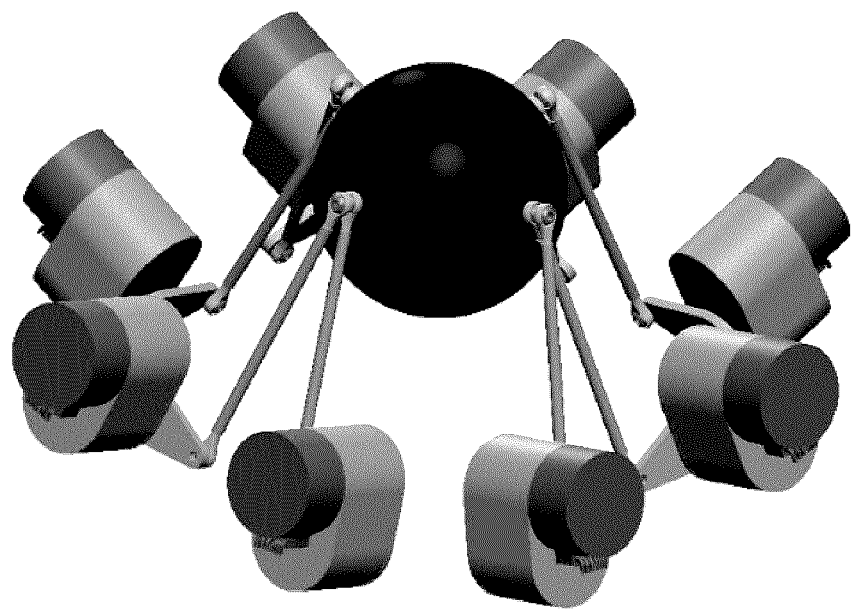
FIG. 22 is a schematic representation of a multiple DOF actuation device using any of the MR fluid clutch apparatuses of FIG. 1 to FIG. 7.

FIG. 22 is a schematic representation of a multiple DOF actuated system with MR actuator units working in cooperation (eight shown), with the sphere being a common output (for instance as part of a ball joint or swivel). In this configuration, certain DOFs (i.e. translation in x, y and z) may be locked. In this configuration, at least nDOF+1 MR actuator units may cooperate in order to generate a force (x, y or z) or moment (Mx, My or Mz) in the desired direction. Moreover, each MR actuator unit may be composed of multiple MR actuators themselves. In this configuration, the force or torque provided in one direction may be the sum of the torque of multiple MR actuator units cooperating to apply a force in the desired direction. Because of the low impedance characteristic of MR actuator units provided by the use of MR fluid clutch apparatuses, the MR actuator units may be controlled in pure force and hence, allow for force cooperation. A system with a high impedance and hence lower bandwidth, would results in force fighting between the actuators and therefore, the resulting force could be difficult to control or adjust precisely. In this FIG. 22, eight MR actuator units are cooperating to actuate an actuated output (such as a platform). The eight MR actuator units may result in an over-actuated system with redundancy. With the low impedance MR actuator device of the present disclosure, the resulting force is easily controllable and if one of MR actuator units fails, the system may still be operable.

Figure 23:
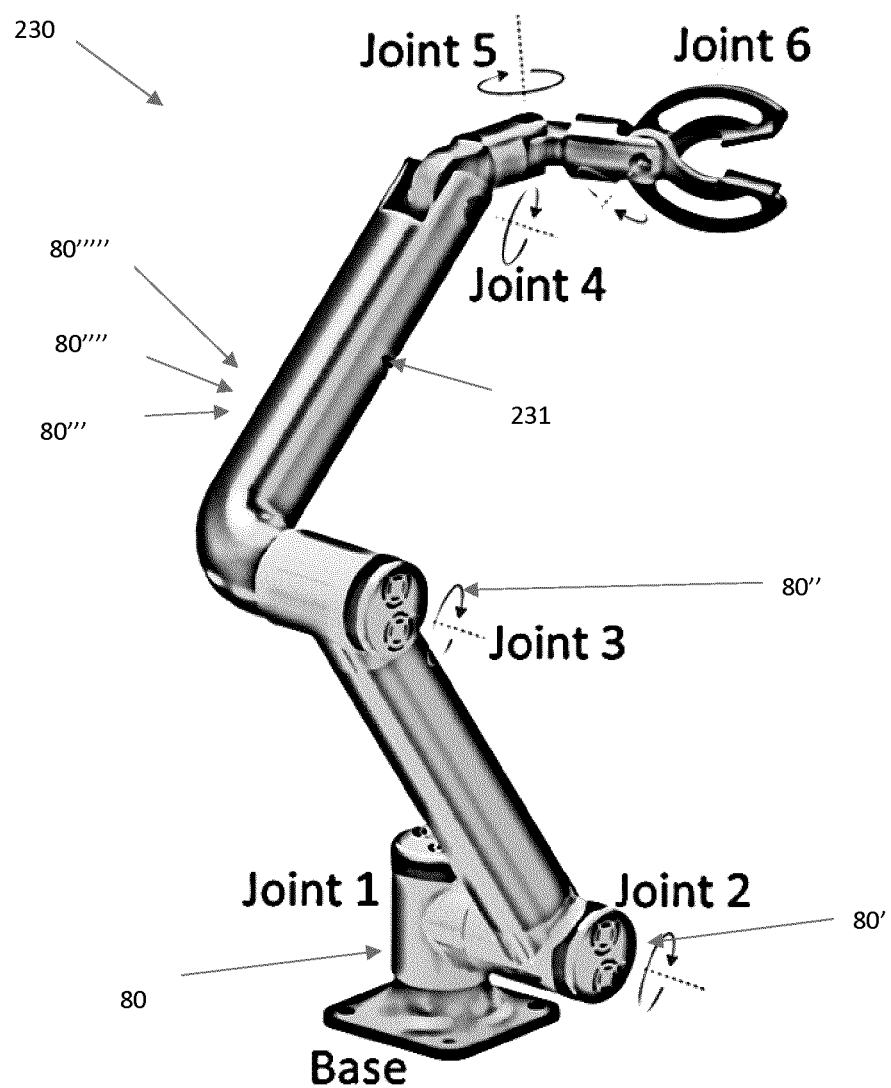
FIG. 23 is a schematic representation of multiple of the MR actuation device of FIG. 8 used in a robotic arm.

FIG. 23 is a schematic representation of multiple MR actuation devices 80 used in a robotic arm 230, also known as serial mechanism. In the configuration, the MR actuation devices 80, 80' and 80" each provide an actuated degree of freedom (DOF) to a respective collocated joint 1, 2 and 3 in order to achieve an arm of multiple DOFs at the end effector (at joint 6). The MR actuation devices 80''', 80'''' and 80''''' are remotely located from the joints 4, 5 and 6, and are inside the robot member 231 (also known as a link). The MR actuation devices 80''', 80'''' and 80''''' actuate the rotational DOFs of joints 4, 5 and 6. Remote actuation may be transferred using belt, cable, shaft, pulleys, gears or any other appropriate mechanical linkage. The remote positioning of the actuation devices 80''', 80'''' and 80''''' from the joints may result in reduced overall inertia of the arm 230 by having the weight of the MR actuators being located closer to the base.

Figure 24:
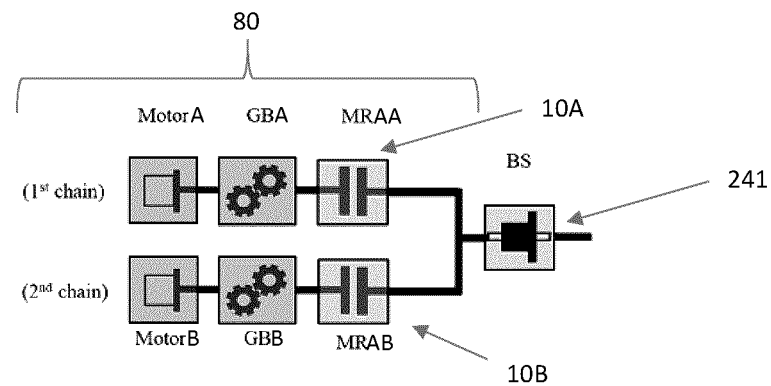
FIG. 24 is a schematic representation of the MR actuation device of FIG. 8 used to control a ball screw.

FIG. 24 is a schematic representation of the MR actuation device 80 of FIG. 8 used to control a ball screw 241. The ball screw 241 is illustrated but any other rotation to linear movement converting mechanism (e.g. rack and pinion) or linkage system may be used. Such a system may be used to control various actuators, including actuators providing active suspensions or steering controls. In the embodiment, the MR actuation device 80 has its MR actuator units MRAA and MRAB produce a rotational output for instance on a lead shaft that with cause a translation of a ball screw, or vice versa. Other types of rotation-to-linear conversion mechanism is contemplated.

Figure 25:
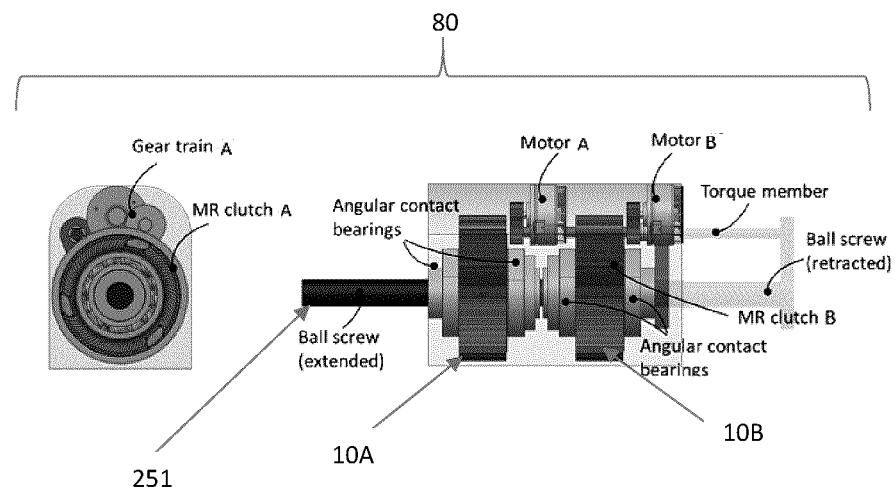
FIG. 25 is a schematic representation of the MR actuation device of FIG. 24 actuating a ball screw.

FIG. 25 is a schematic representation of the MR actuation device of FIG. 24 that is actuating a ball screw in which the MR fluid clutches apparatuses 10A and 10B may be built around the nuts (not shown) of the ball screw. This configuration may provide a compact arrangement. Alternatively, MR clutches apparatuses 10A and 10B may be built around the screw 251.

Figure 26:
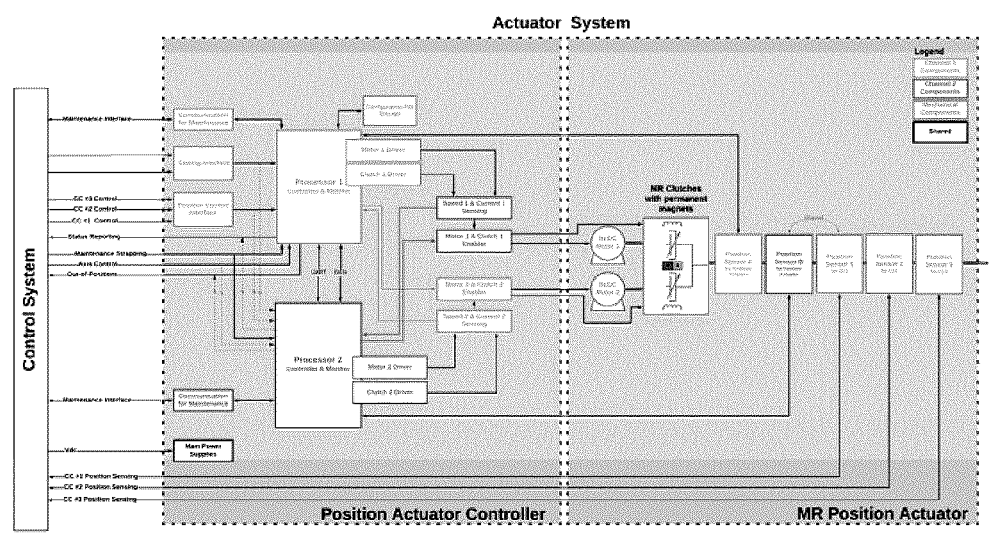
FIG. 26 is schematic representation of a enhanced reliability controller for controlling the MR actuation device when the MR actuation device.

FIG. 26 is schematic representation of controller for controlling the MR actuation device 80 with enhanced reliability, and the controller may be used as the controller 1 shown above. Such enhanced reliability reliable controller 1 may use four processors dispatched in two channels, as an example. In an embodiment, the expression processors entails an independent processing module, as opposed to an independent hardware processor. Each channel features a controller/monitor arrangement that controls one motor and one clutch coil using independent sensors. This way, only one set of motor and MR fluid clutch apparatus (e.g., MR actuator unit) is turned off in case of disagreement between the two processors of a channel. In this situation, the MR fluid clutch apparatus of the healthy channel is locked, and the motor controls the MR actuator unit like a conventional servo-motor. Haptic performance is degraded in this mode, since the inertia, friction and cogging of the motor and gear reduction are reflected at output. Also, the lower mechanical bandwidth available in this degraded mode may prevent the backup parallel stability and control augmentation in case of malfunction of one of the control computer (CC) cards. System functions remain available despite a single failure, except in case of the force sensors. For that reason, the preliminary architecture shown in FIG. 26 may includes two independent force sensors. With this arrangement, a discrepancy between the force sensor readings may lead to a failed-passive system. A slightly different approach using additional force sensing redundancy may also be implemented in order to maintain closed-loop force control capability in case of failure of one of the force sensors.

Figure 27:
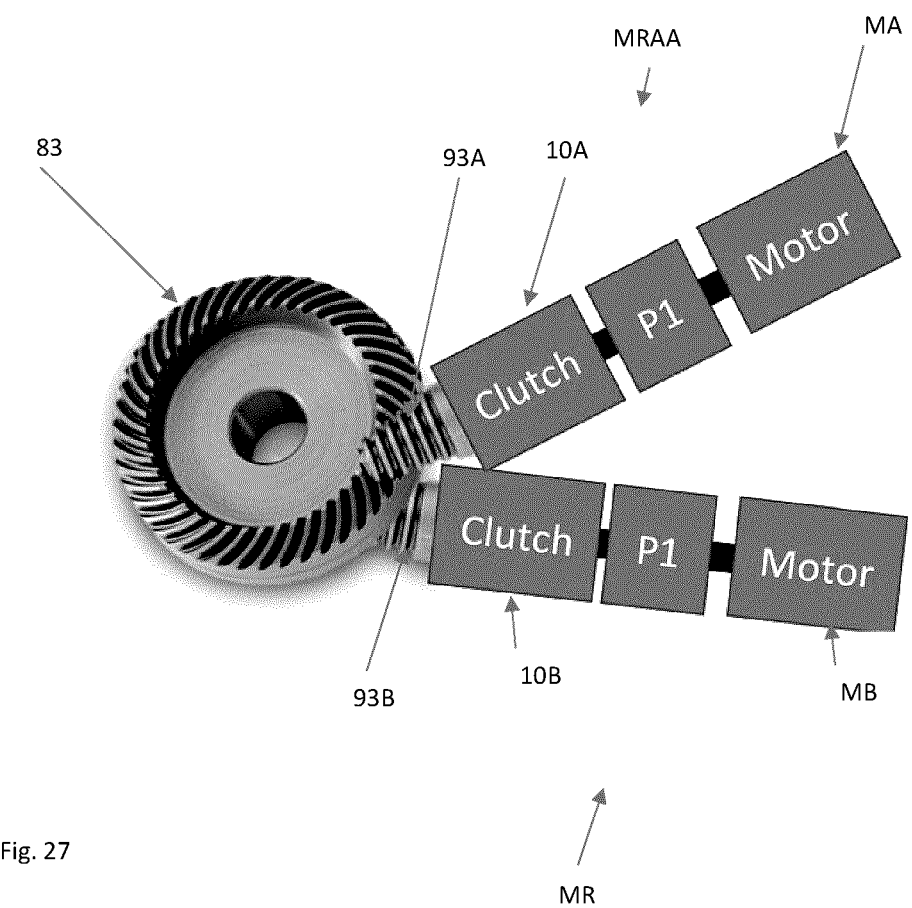
FIG. 27 is a schematic perspective view of a variant of the MR actuation device in accordance with the present disclosure, using a spiral bevel gear.

Referring to FIG. 27, the MR actuator device 80 is shown as having two MR actuator units, MRAA and MRAB, with the common output 83 being driven, hypoid or spheroid gears 93A, 93B, or like gears such as a worm gear, spiral bevel gear. In the illustrated embodiment, one such gear 93A is operatively coupled to a first face of a crown gear used as common output 83, where as the other gear 93B is operatively coupled to a second face of a crown gear used as common output 83. Gears 93A, 93B, 93n (if others are present) could be coupled to the same face of the output gear 83. The hypoid gear is a type of spiral bevel gear having a rotational axis that does not intersect with the axis of the output gear 83. The shape of a hypoid gear is a revolved hyperboloid. A spiral bevel gear could be used, and would have a normally conical shape. Likewise, a spheroid gear has a spheroidal profile and could be used. Moreover, FIG. 27 shows a limited number of components, including reduction mechanisms P1. The output 83 and gears 93A, 93B of FIG. 27 could be used in the variant of FIGS. 9 to 13 of the MR actuator device 80. Optionally, a rotational axis of the gears 93A and/or 93B is parallel to a rotational axis of the respective MR fluid clutch apparatus 10A, 10B.

The controller 1 may be described as being part of a system for driving an output member of a magnetorheological (MR) actuator device having at least two MR actuator units respectively outputting maximum torque T1 and torque T2. The system may include a processing unit and a non-transitory computer-readable memory communicatively coupled to the processing unit and comprising computer-readable program instructions executable by the processing unit for: controlling two or more MR actuator units to transmit torque in a common direction to a common output member in a collaborative mode, the torque at the common output member in the collaborative mode being greater than maximum torque T1 or maximum torque T2; controlling the at least two MR actuator units to transmit torque in opposite directions to the common output member in an antagonistic mode, the torque at the common output member in the antagonistic mode being at most equal to maximum torque T1 or maximum torque T2.

In some instances, the system may perform some steps or actions such as: controlling the at least two MR actuator units in the collaborative mode includes controlling a slippage in at least one MR fluid clutch apparatus; controlling the at least two MR actuator units in the antagonistic mode includes controlling a slippage in at least one MR fluid clutch apparatus; controlling the at least two MR actuator units to transmit torque in the collaborative mode, includes controlling the at least two MR actuator units to transmit torque at the common output member being a sum of maximum torque T1 or maximum torque T2; for three of the MR fluid actuator units with a third MR fluid actuator unit outputting maximum torque T3, controlling the MR actuator units in the antagonistic mode includes controlling two of the MR actuator units to transmit torque in a common direction to the output member, and controlling a third of the MR actuator units to transmit torque to the output member in a direction opposite to the direction of the two MR actuator units, the torque at the common output member in the antagonistic mode being at most equal to maximum torque T1, maximum torque T2 or maximum torque T3.

What is claimed is:

1. A magnetorheological (MR) actuator device comprising:
    at least two MR actuator units, each of the MR actuator units including at least:
        a motor being bi-directional, and
        an MR fluid clutch apparatus operatively coupled to the motor to receive torque from the motor, the MR fluid clutch apparatus operable to generate a variable amount of torque transmission when subjected to a magnetic field;
    an output member;
    a transmission operatively coupling the at least two MR actuator units to the output member, for the output member to receive torque from the at least two MR actuator units, the transmission having at least one reduction mechanism between the MR fluid clutch apparatus and the output member for at least one of the at least two MR actuator units; and a controller for controlling the at least two MR actuator units to drive the output member, the controller configured for driving the output member in at least an antagonistic mode in which the at least two MR actuator units transmit torque in opposite directions to the output member, and configured for driving the output member in a collaborative mode in which the at least two MR actuator units transmit torque in a common direction to the output member.

2. The magnetorheological (MR) actuator device according to claim 1, wherein at least one reduction mechanism is located between the bi-directional motor and the MR fluid clutch apparatus for at least one of the at least two MR actuator units.

3. The magnetorheological (MR) actuator device according to claim 2, wherein the transmission includes a spiral bevel gear coupled to the output member for at least one of the at least two MR actuator units.

4. The magnetorheological (MR) actuator device according to claim 3, wherein a rotational axis of the spiral bevel gear is parallel to a rotational axis of at least one of the MR fluid clutch apparatuses.

5. The magnetorheological (MR) actuator device according to claim 4, wherein the spiral bevel gear is a hypoid gear or a spheroid gear.

6. The magnetorheological (MR) actuator device according to claim 3, wherein the output member is a crown gear.

7. The magnetorheological (MR) actuator device according to claim 1, wherein the at least two MR actuator units include at least three of the two MR actuator units.

8. The magnetorheological (MR) actuator device according to claim 7, wherein the controller in the antagonistic mode is configured to drive the output member by having two of the MR actuator units transmit torque in a common direction to the output member, and having a third of the MR actuator units transmit torque to the output member in a direction opposite to the direction of the two MR actuator units.

9. A single degree of freedom actuation system comprising:

at least two MR fluid clutch apparatuses and at least two power sources operatively connected to the at least two MR fluid clutch apparatuses, a first interface adapted to be secured to a first part, a second interface adapted to be secured to a second movable part, at least one joint providing a degree of freedom between the first interface and the second interface;

the at least two MR fluid clutch apparatus operable to generate a variable amount of torque transmission when subjected to a magnetic field;

a transmission coupling the MR fluid clutch apparatuses to the degree of freedom, the transmission having at least one reduction mechanism operatively connected to at least one of the at least two MR fluid clutch apparatuses;

a controller for controlling the at least two MR fluid clutch apparatuses to drive the degree of freedom, the controller configured for driving the degree of freedom in at least an antagonistic mode in which the at least two MR actuator units transmit torque in opposite directions to the degree of freedom, and configured for driving the degree of freedom in a collaborative mode in which the at least two MR fluid clutch apparatuses transmit torque in a common direction to the degree of freedom.

10. The system according to claim 9, wherein each MR fluid clutch apparatus is connected to its own independent one of the power sources.

11. The system according to claim 9, wherein the torque generated by the MR fluid actuators may be added one to the other.

12. The system according to claim 9, wherein the torque generated by the MR fluid actuators may be applied antagonistically in opposite directions.

13. The system according to claim 9, wherein at least one of the MR fluid actuators is equipped with a brake.

14. The system according to claim 9, wherein one of the at least two power sources is connected to multiple MR clutch apparatuses.

* * * * *